US012723599B2

(12) United States Patent
Hebling et al.

(10) Patent No.: US 12,723,599 B2
(45) Date of Patent: Sep. 1, 2026

(54) ASSEMBLY SYSTEM FOR A PORTABLE FAN

(71) Applicant: Lasko Operation Holdings LLC, West Chester, PA (US)

(72) Inventors: Thomas Hebling, Oreland, PA (US); Robert Pike, Bristol, CT (US); Neil Franciotti, Doylestown, PA (US)

(73) Assignee: LASKO OPERATION HOLDINGS LLC, West Chester, PA (US)

( * ) Notice: Subject to any disclaimer, the term of this patent is extended or adjusted under 35 U.S.C. 154(b) by 29 days.

(21) Appl. No.: 18/912,773

(22) Filed: Oct. 11, 2024

(65) Prior Publication Data

US 2025/0122889 A1 Apr. 17, 2025

Related U.S. Application Data

(60) Provisional application No. 63/654,435, filed on May 31, 2024, provisional application No. 63/621,312, filed on Jan. 16, 2024, provisional application No. 63/544,030, filed on Oct. 13, 2023.

(51) Int. Cl.

| | |
|---|---|
| ***F04D 29/64*** | (2006.01) |
| ***F04D 25/06*** | (2006.01) |
| ***F04D 29/52*** | (2006.01) |
| ***F04D 29/70*** | (2006.01) |
| ***G08B 21/18*** | (2006.01) |

(52) U.S. Cl.

CPC ........... *F04D 29/644* (2013.01); *F04D 25/06* (2013.01); *F04D 29/522* (2013.01); *F04D 29/703* (2013.01); *G08B 21/18* (2013.01)

(58) Field of Classification Search

CPC ...... F04D 29/644; F04D 25/06; F04D 29/522; F04D 29/703; F04D 25/08; F04D 25/084; F04D 29/601; F04D 29/646; G08B 21/18

See application file for complete search history.

(56) References Cited

U.S. PATENT DOCUMENTS

| | | | | | |
|---|---|---|---|---|---|
| 5,251,281 | A * | 10/1993 | Fravel, Jr. | F24H 3/0423 | 15/327.5 |
| 6,364,618 | B1 * | 4/2002 | Moreno | F04D 29/703 | 415/214.1 |
| 6,585,489 | B2 * | 7/2003 | Perella | F04D 29/703 | 416/247 R |
| RE39,570 | E * | 4/2007 | Perella | F04D 29/703 | 416/247 R |

(Continued)

*Primary Examiner* — Hoang M Nguyen

(74) *Attorney, Agent, or Firm* — Troutman Pepper Locke LLP

(57) ABSTRACT

A portable fan includes an air generation assembly. The air generation assembly includes a motor assembly, a rear grill, a front grill connected to the rear grill, an internal space defined by the rear grill and the front grill, and an impeller located substantially within the internal space. The motor assembly includes a polymer housing including connecting features formed integral to the polymer housing and a shaft extending from the polymer housing. The impeller is connected to the shaft of the motor assembly and located substantially within the internal space. The rear grill has a central opening to interface with the connecting features of the polymer housing. Connection of the rear grill and the motor assembly is achieved absent the use of additional fasteners and/or additional components.

14 Claims, 39 Drawing Sheets

(56) References Cited

U.S. PATENT DOCUMENTS

| | | | | | |
|---|---|---|---|---|---|
| D676,124 | S * | 2/2013 | Almanza | ...................... | D23/378 |
| 11,536,294 | B1 * | 12/2022 | Zhu | ...................... | F04D 29/046 |
| 2022/0228702 | A1 * | 7/2022 | Dai | ...................... | F04D 29/601 |

* cited by examiner

SECTION 3–3

SECTION 11-11

VIEW 20–20

SECTION 21—21

SECTION 24–24

SECTION 26–26

ASSEMBLY SYSTEM FOR A PORTABLE FAN

CROSS REFERENCE TO RELATED APPLICATIONS

This application claims priority to U.S. Provisional Patent Application Ser. No. 63/544,030 titled Assembly System for a Portable Fan and filed Oct. 13, 2023, and U.S. Provisional Patent Application Ser. No. 63/621,312 titled Box Fan Assembly Structure and filed Jan. 16, 2024, and U.S. Provisional Patent Application Ser. No. 63/654,435 titled Air Circulator and filed May 31, 2024, each of which are hereby incorporated by reference in their entireties.

TECHNICAL FIELD

The present disclosure relates to portable fans. More specifically, the disclosure relates to an assembly system for a portable fan which provides the end user of the product with simple and intuitive assembly without tools and minimized fasteners and components.

BACKGROUND

Conventional fans are manufactured and sold to end users through retail and online markets. Fans are sold assembled with no assembly required for the end user. Conventional fan structures include fasteners such as screws and glues which may have several disadvantages. The use of screws and glues increase the cost and complexity to manufacture the conventional fan.

Also, a fully assembled conventional fan may be detrimental to the manufacturer and the retail markets because a fully assembled device requires a larger volume product carton which must be shipped and transported, increasing costs and ultimately the price to the end user.

One method to overcome this transportation, i.e. shipping, issue is to provide an unassembled or partially assembled portable fan to the end user. This decreases the volume of the product carton and reduces shipping costs. However, an unassembled or partially assembled portable fan may be an impediment to the end user, particularly end users who do not own tools or do not possess the skills needed to assemble and or complete the assembly of the product. As such, end users may avoid purchasing an "assembly required" product. Such consumer avoidance serves to increase the cost for all parties involved and can have a detrimental effect on the environment, requiring more expended energy and materials in the transportation and shipping of the product.

Off-season storage is common for portable fans and other such appliances which have periodic or seasonal use. Power cords, extension feet and other structures often impede the space efficiency of storing the device in the off-season. The same impediments regarding end user assembly also impede easy disassembly for cleaning and off-season storage of a conventional fan.

Conventional fans often require the end user to assemble stabilization feet or supports prior to use. The stabilization feet can be difficult to assemble and in some cases the fan can still be used even if the stabilization feet are not deployed on the product. The ability to use the fan absent the stabilization feet is not desired and may create a safety hazard. Also, when assembled and deployed the stabilization feet may protrude from the fan making off-season storage cumbersome and requiring additional storage space.

In short, assembly systems associated with conventional portable fans require excessive end user attention and/or skills which people may not possess. These same issues prove to be a disadvantage for the manufacturer and retailer requiring them to produce and sell a fully assembled portable fan. What is needed is a fan assembly system with an intuitive assembly and disassembly system which minimizes the need for tools or special skills of the end user while at the same time creating cost savings advantages for the manufacturer, retailer and the end user.

The present disclosure is directed to overcoming these and other problems of the prior art.

SUMMARY

Embodiments of the present invention address and overcome one or more of the above shortcomings and drawbacks, by providing an assembly system for an air moving device which is designed to easily assemble and disassemble. Although appliances have used snaps and other connection system features for many years, these systems are commonly achieved using additional parts and components to secure assembly. The assembly system described herein utilizes structures integrated into the primary components, i.e., no additional parts, fasteners or minor components. Integrating the assembly structures into existing primary components of the device can result in manufacturing and cost advantages.

The assembly structure disclosed also allows for easy disassembly for cleaning. Also disclosed are rotatably articulated stabilization feet and other features which aid the end user by more efficiently configuring the device for off-season storage. These features create desirable advantages and additional functionality for the end user when compared to conventional fans.

In an exemplary embodiment, a portable fan includes an air generation assembly. The air generation assembly includes a motor assembly, a rear grill, a front grill connected to the rear grill, an internal space defined by the rear grill and the front grill, and an impeller located substantially within the internal space. The motor assembly includes a polymer housing including connecting features formed integral to the polymer housing and a shaft extending from the polymer housing. The impeller is connected to the shaft of the motor assembly and located substantially within the internal space. The rear grill has a central opening to interface with the connecting features of the polymer housing. Connection of the rear grill and the motor assembly is achieved absent the use of additional fasteners and/or additional components.

In another exemplary embodiment, a portable fan comprising includes a motor assembly and an impeller of unitary polymer construction. The motor assembly includes a housing and a shaft extending from the housing. The shaft includes an axis of rotation of the shaft and a shaft connection feature extending perpendicular to the axis of rotation of the shaft. The impeller includes a hub and multiple paddles extending radially outward from the hub. The hub includes a central socket to interface with connecting features of the shaft and the shaft connection feature, and an impeller connection feature located proximate the central socket. Connection of the impeller to the shaft of the motor assembly is achieved absent the use of additional fasteners and/or additional components.

In yet another exemplary embodiment, a portable fan includes an air generation assembly, a base for supporting the air generation assembly above a surface at a predetermined elevation, and an extension located between the base and the air generation assembly and connected to the base and the air generation assembly. The air generation assembly includes a motor assembly, a grill assembly defining an internal space, and an impeller located substantially within the internal space. The base includes a center socket and an outer extent. The extension includes a first portion and a second portion. The first portion includes a first end including an adaptor capable of connecting to the air generation assembly and a second end, The second portion includes a first end including an adaptor capable of connecting to the second end of the first portion and/or the air generation assembly and a second end. The second end of the first portion and/or the second end of the second portion can both interface and connect to the center socket of the base.

This summary is provided to introduce a selection of structural concepts in a simplified form that are further described below in the detailed description. This summary is not intended to identify key features or essential features of the claimed subject matter, nor is it intended to be used to limit the scope of the claimed subject matter. Additional features and advantages of the disclosed technology will be made apparent from the following detailed description of illustrative embodiments that proceeds with reference to the accompanying drawings.

BRIEF DESCRIPTION OF THE DRAWINGS

The invention is best understood from the following detailed description when read in connection with the accompanying drawing. For the purpose of illustrating the invention, there are shown in the drawings embodiments that are presently preferred, it being understood, however, that the invention is not limited to the specific instrumentalities disclosed. It is emphasized that, according to common practice, the various features of the drawing are not to scale. On the contrary, the dimensions of the various features are arbitrarily expanded or reduced for clarity. Included in the drawing are the following Figures.

DETAILED DESCRIPTION OF ILLUSTRATIVE EMBODIMENTS

Figure 1:
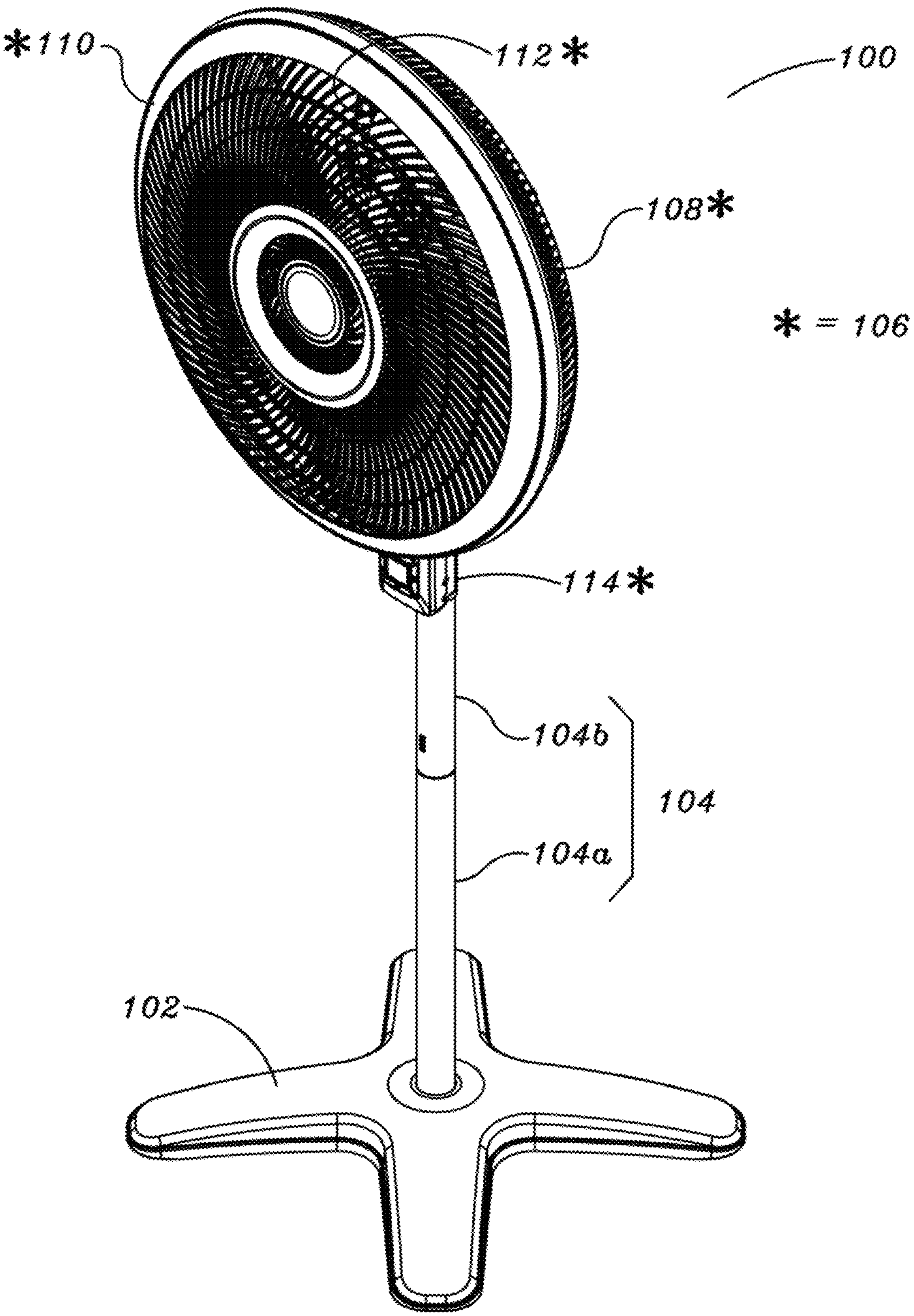
FIG. 1 is an embodiment of a fully assembled portable fan utilizing the described assembly system.

FIGS. 1-14*c* illustrate the tool-free assembly of a portable fan 100, according to embodiments of the present disclosure. FIG. 1 is an embodiment of a fully assembled portable fan 100 utilizing the described assembly system. As shown base 102 supports portable fan 100 in an upright position. Extension 104 is composed of a lower portion 104*a* and upper portion 104*b* and elevates air generation assembly 106 above the surface on which base 102 is located.

As shown air generation assembly 106 includes rear grill 108 and front grill 110 which define an internal space. Impeller 112 is located within the internal space defined by rear grill 108 and front grill 110. Motor assembly 114 is connected to rear grill 108 and is rotationally connected to impeller 112.

Figure 2:
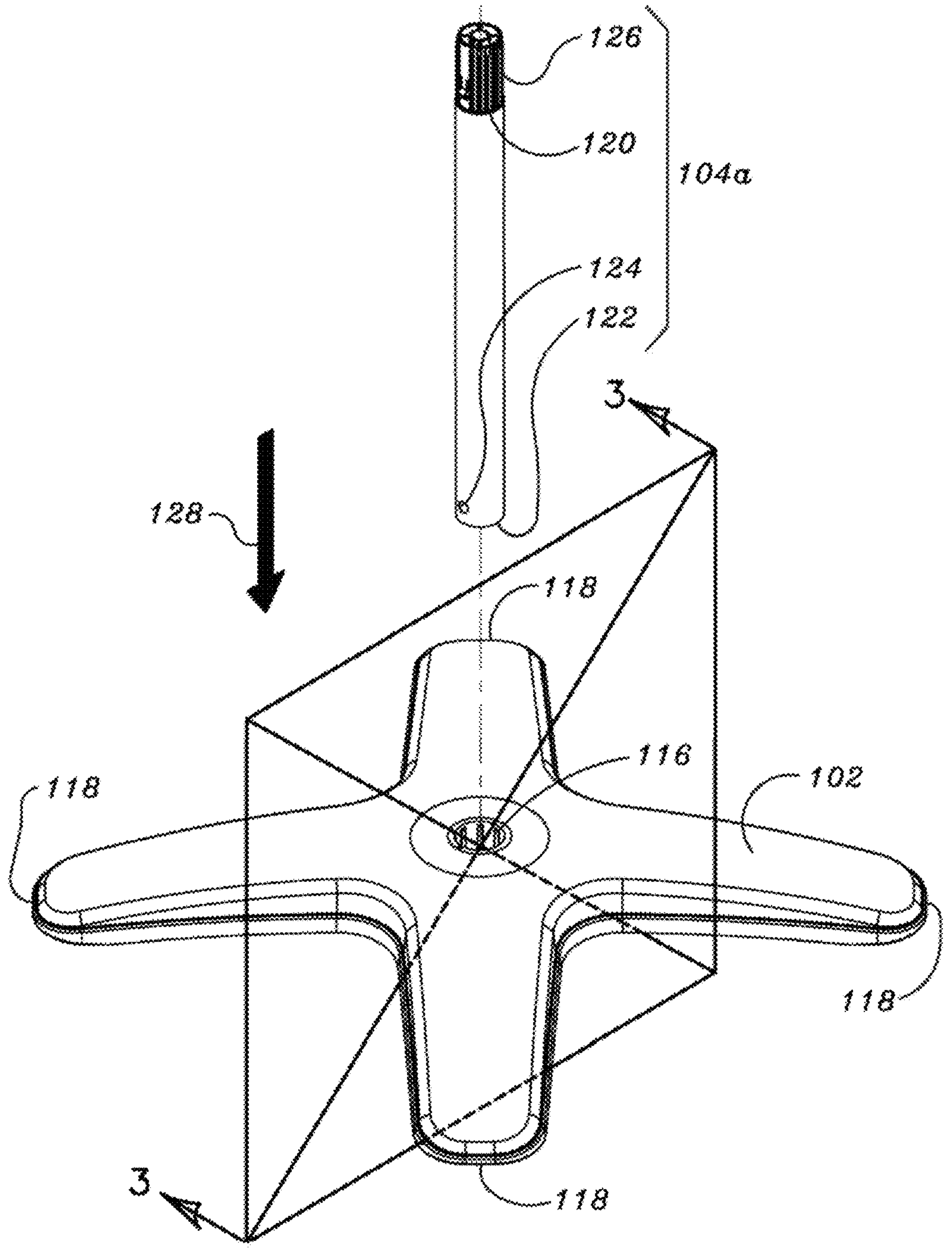
FIG. 2 and FIG. 3 illustrate an embodiment of the assembly interface between height extension and base of a portable fan utilizing the described system.
Figure 3:
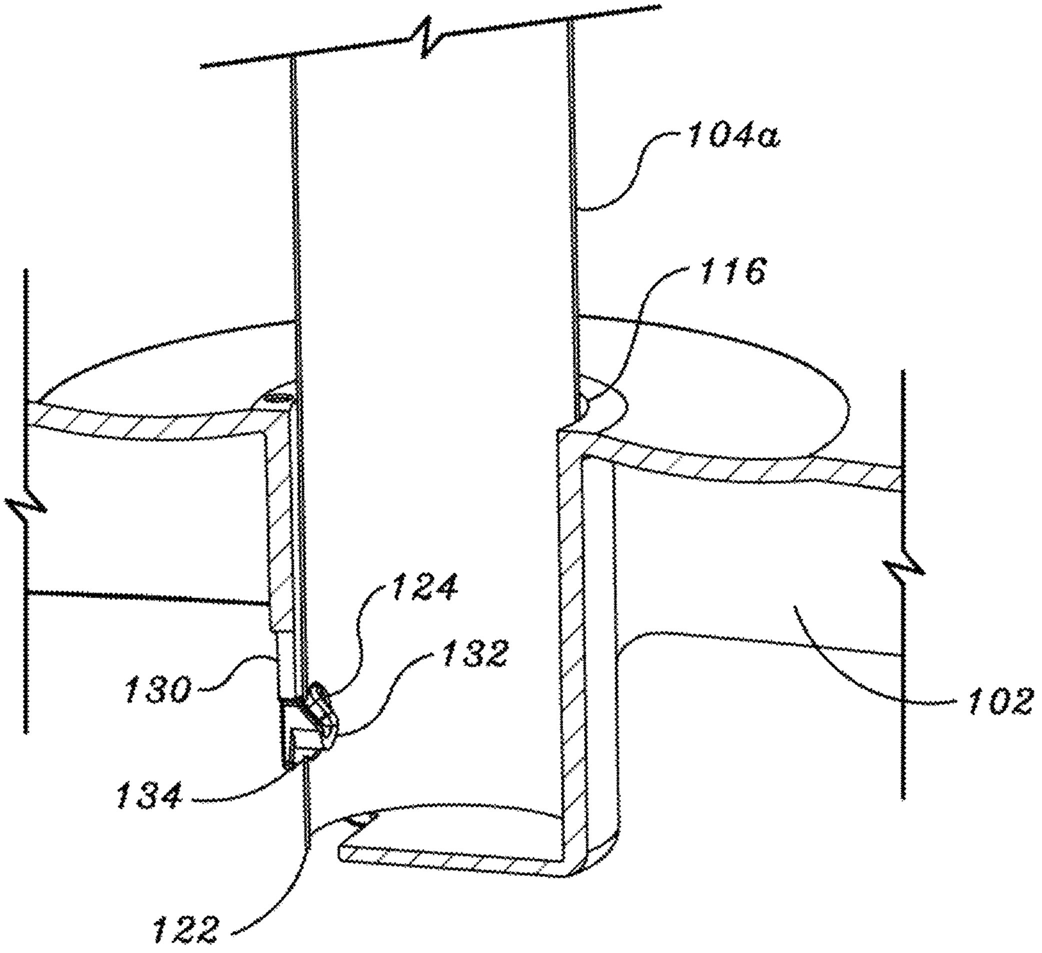

FIG. 2 and FIG. 3 illustrate an embodiment of the assembly interface between the extension 104 and base 102. As can be seen in FIG. 2 lower portion 104*a* includes lower end 122, upper end 120 and adaptor "A" 126 located proximate upper end 120. Also shown is hole 124 located proximate lower end 122. Base 102 includes center socket 116 and multiple extensions 118. Directional arrow 128 illustrates the direction of movement required to insert lower end 122 into center socket 116. Also shown is section plane 3-3.

FIG. 3 is a cross section view of section plane 3-3. As shown lower portion 104*a* has been inserted into center socket 116 of base 102. Center socket 116 includes an inward protrusion 132 which corresponds to hole 124 and enters in and/or through hole 124 when lower portion 104*a* is fully inserted into base 102. Protrusion 132 is connected to base 102 via cantilever 130 which allows protrusion 132 to be displaced out of position when lower portion 104*a* is in the process of being inserted into center socket 116. When lower portion 104*a* is in correct assembled position, i.e. hole 124 is aligned with protrusion 132, cantilever 130 allows protrusion 132 to return to its original position thereby interlocking with hole 124 and securing lower portion 104*a* in position. Overhang 134, also part of base 102, can be used to lift protrusion 132 out of full engagement with hole 124 and allow lower portion 104*a* to be removed from base 102. When protrusion 132 enters hole 124 and is fully engaged the movement of protrusion 132 entering hole 124 may provide an audible sound and/or a tactile engagement to indicate base 102 has been secured to lower portion 104*a*. With the features described above with respect to FIGS. 2 and 3, base 102 and lower portion 104*a* can be assembled and disassembled absent the use of tools.

Figure 4A:
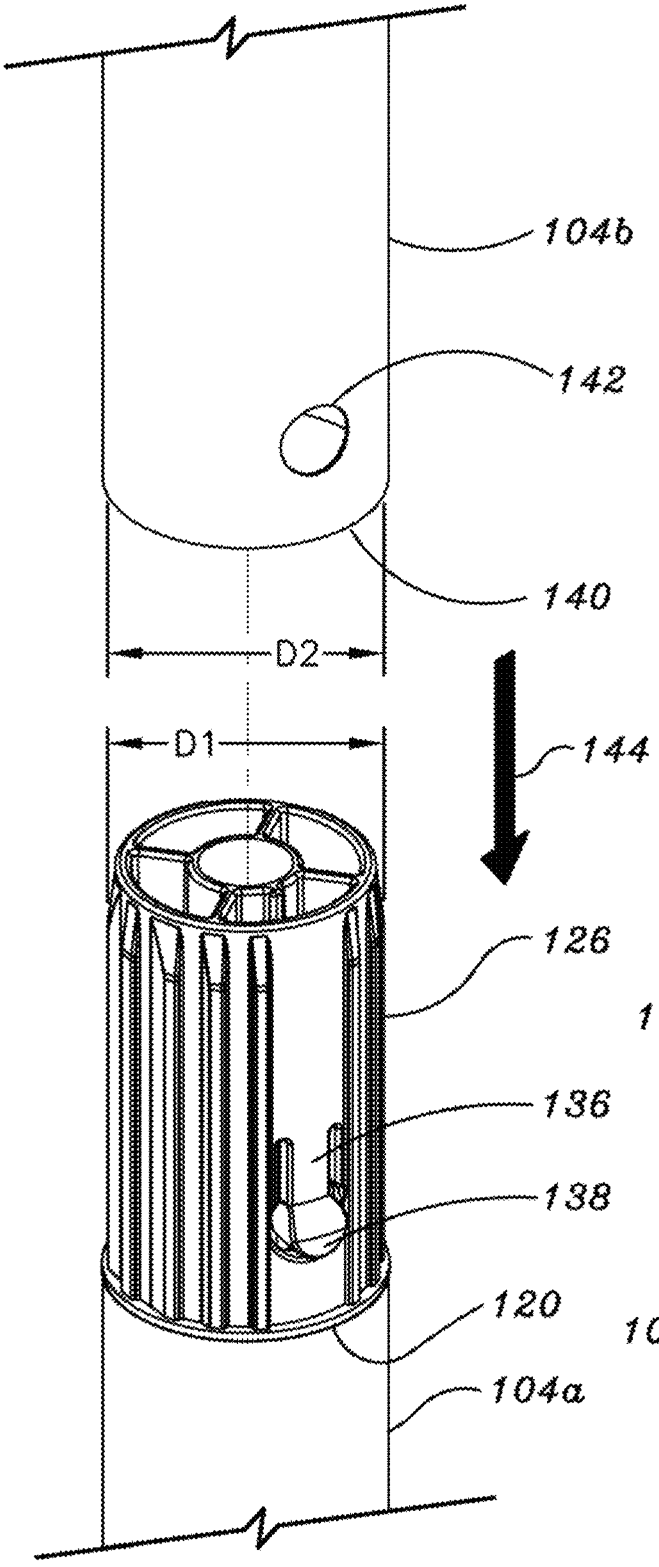
FIG. 4*a* and FIG. 4*b* illustrate an embodiment of the assembly interface between a lower height extension portion and an upper height extension portion of a portable fan utilizing the described system.
Figure 4B:
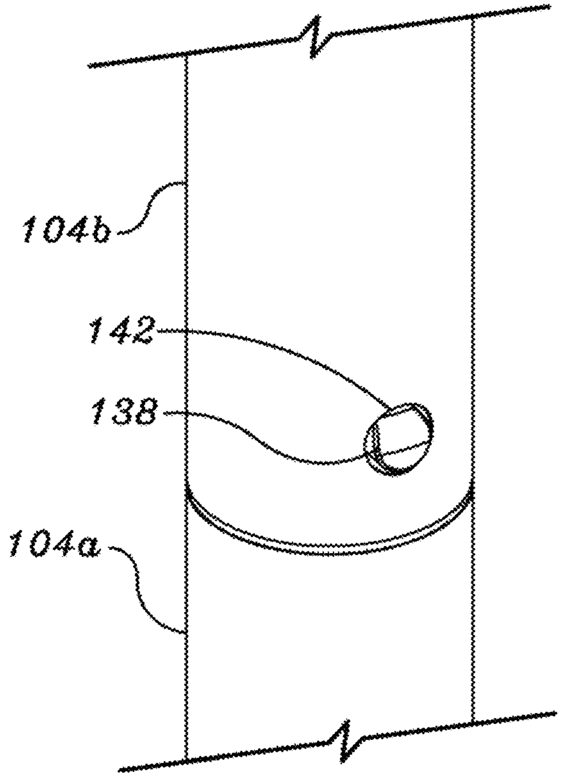

FIG. 4*a* and FIG. 4*b* illustrate an embodiment of the assembly interface between lower portion 104*a* and upper portion 104*b* of extension 104. As shown in FIG. 4*a* adaptor "A" 126 includes cantilever 136 and outward protrusion 138, cantilever 136 allows protrusion 138 to be displaced and return to its original position. Upper portion 104*b* includes lower end 140 and hole 142 located proximate lower end 140. Also shown is external diameter "D1" of adaptor "A" 126 and internal diameter "D2" of upper portion 104*b*. When upper portion 104*b* is moved as per direction arrow 144 internal diameter "D2" passes over external diameter "D1" until outward protrusion 138 is aligned with hole 142. In FIG. 4*b* the function of the interface between hole 142 and protrusion 138 interlocks lower portion 104*a* to upper portion 104*b*. The interlock between lower portion 104*a* and upper portion 104*b* can be disengaged with pressure applied to displace protrusion 138 from full engagement with hole 142.

It is contemplated that adaptor "A" 126 and lower portion 104*a* may be pre-assembled during production of fan 100 at the manufacturer. It is also contemplated that, like the full engagement of protrusion 132 and hole 124, the full engagement of protrusion 138 and hole 142 may provide an audible sound and/or a tactile engagement to indicate lower portion 104*a* has been secured to the upper portion 104*b*. With the features described above with respect to FIGS. 4*a* and 4*b*, upper portion 104*b* and lower portion 104*a* can be assembled and disassembled absent the use of tools.

Figure 5:
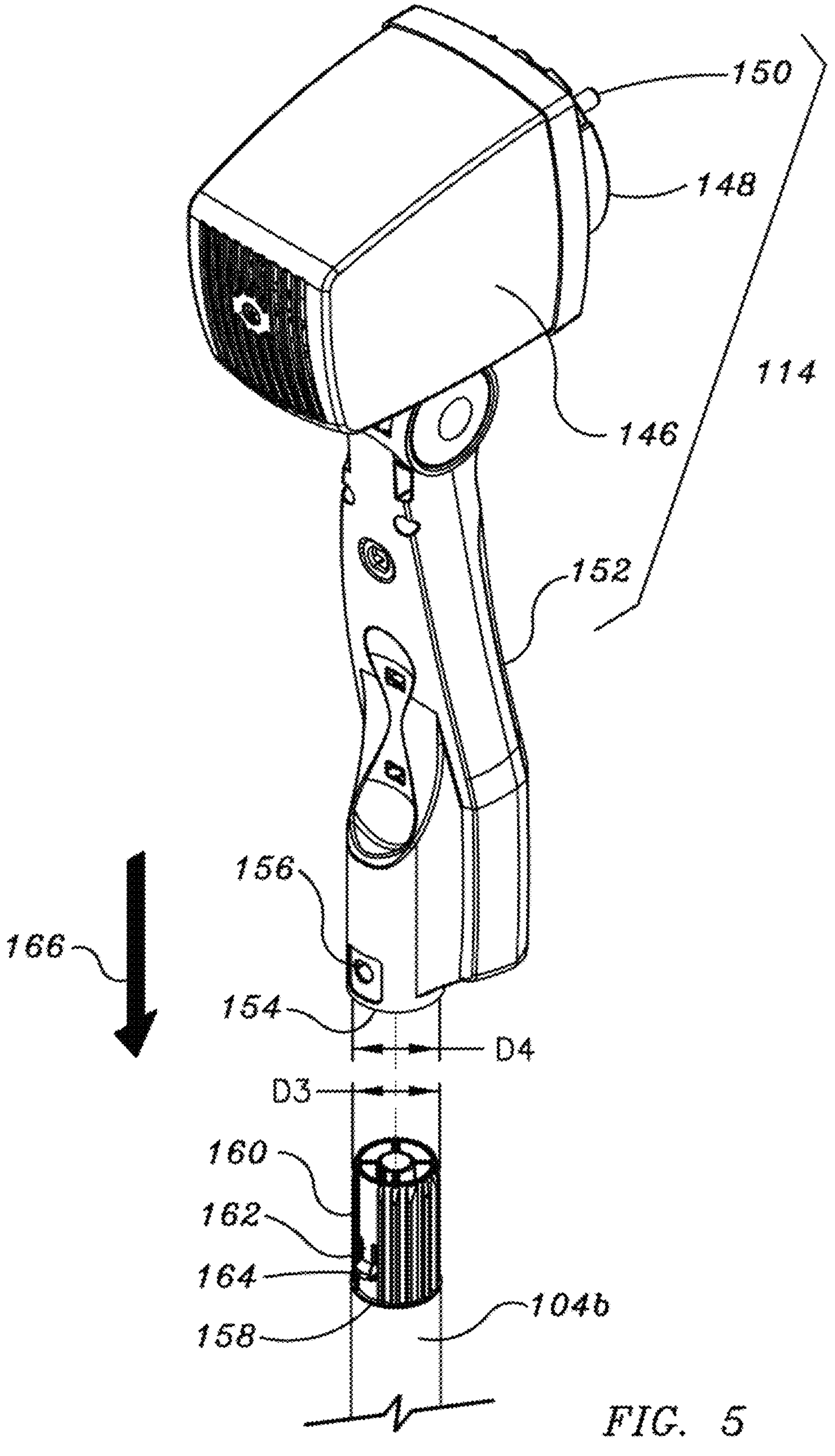
FIG. 5 and FIG. 6 illustrate an embodiment of the assembly interface between an upper height extension portion and a motor assembly of a portable fan utilizing the described system.
Figure 6:
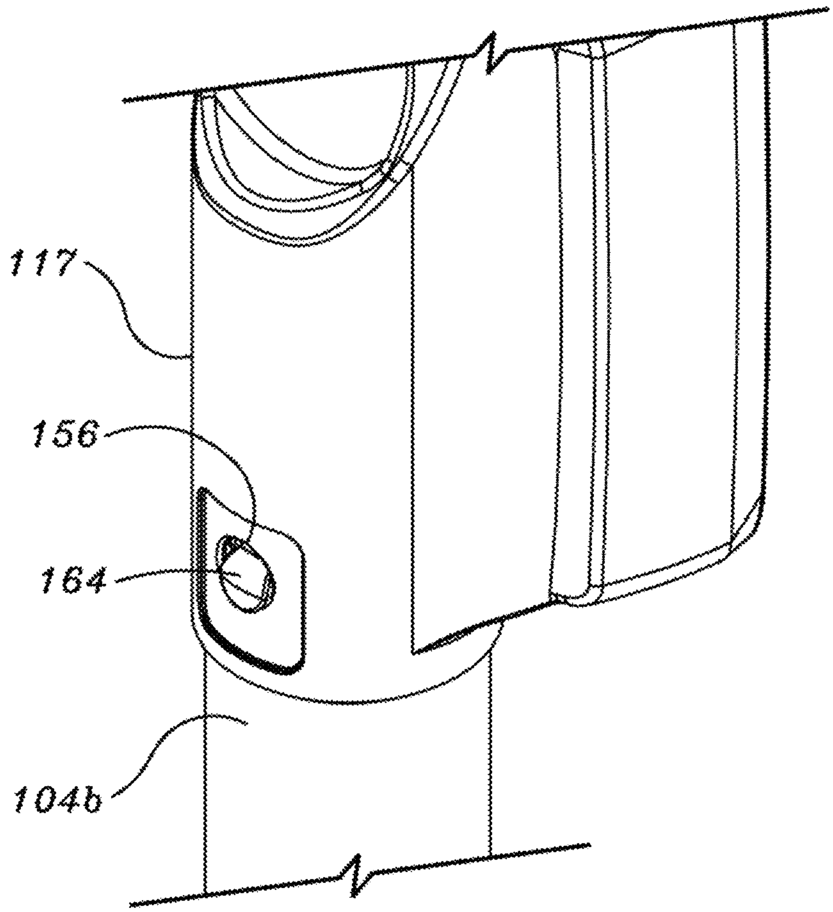

FIG. 5 and FIG. 6 illustrate an embodiment of the assembly interface between upper portion 104*b* of extension 104 and motor assembly 114 of a portable fan 100. As shown in FIG. 5 motor assembly 114 includes motor cover 146, motor adaptor portion 148, motor extension 152 and shaft 150. Adaptor "B" 160 is located proximate upper end 158 of upper portion 104*b*. Adaptor "B" 160 includes cantilever 162 and outward protrusion 164. Cantilever 162 allows protrusion 164 to be displaced and return to its original position. Also shown is lower end 154 of motor extension 152 and hole 156 located proximate lower end 154. Also shown is external diameter "D3" of adaptor "B" 160 and internal diameter "D4" of upper motor extension 152. When motor assembly 114 is moved as per direction arrow 166 internal diameter "D4" passes over external diameter "D3" until outward protrusion 134 is aligned with hole 156. In FIG. 6 the function of the interface between hole 156 and protrusion 164 interlocks upper portion 104*b* to motor assembly 114. The interlock between upper portion 104*b* and motor assembly 114 can be disengaged with pressure applied to displace protrusion 164 from full engagement with hole 156.

Similar to FIGS. 4*a* and 4*b*, it is contemplated that adaptor "B" 160 and upper portion 104*b* may be pre-assembled during production of fan 100 at the manufacturer. It is also contemplated that the full engagement of protrusion 164 and hole 156 may provide an audible sound and/or a tactile engagement to indicate upper portion 104*b* has been secured to the motor assembly 114. With the features described above with respect to FIGS. 5 and 6, upper portion 104*b* and motor assembly 114 can be assembled and disassembled absent the use of tools.

Figure 7:
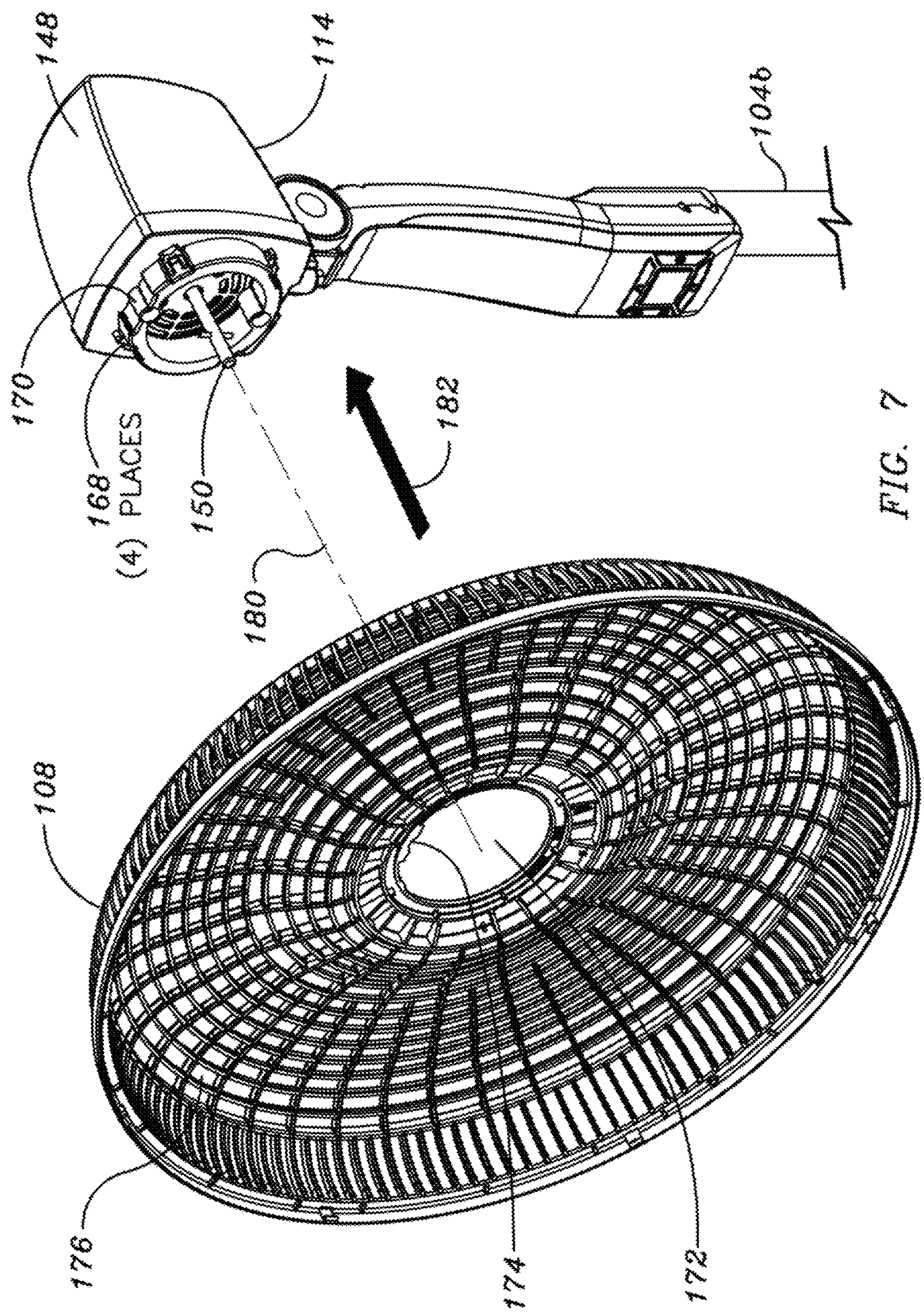
FIG. 7 and FIG. 8 illustrate an embodiment of the assembly interface between a motor assembly and a rear grill of a portable fan utilizing the described system.
Figure 8:
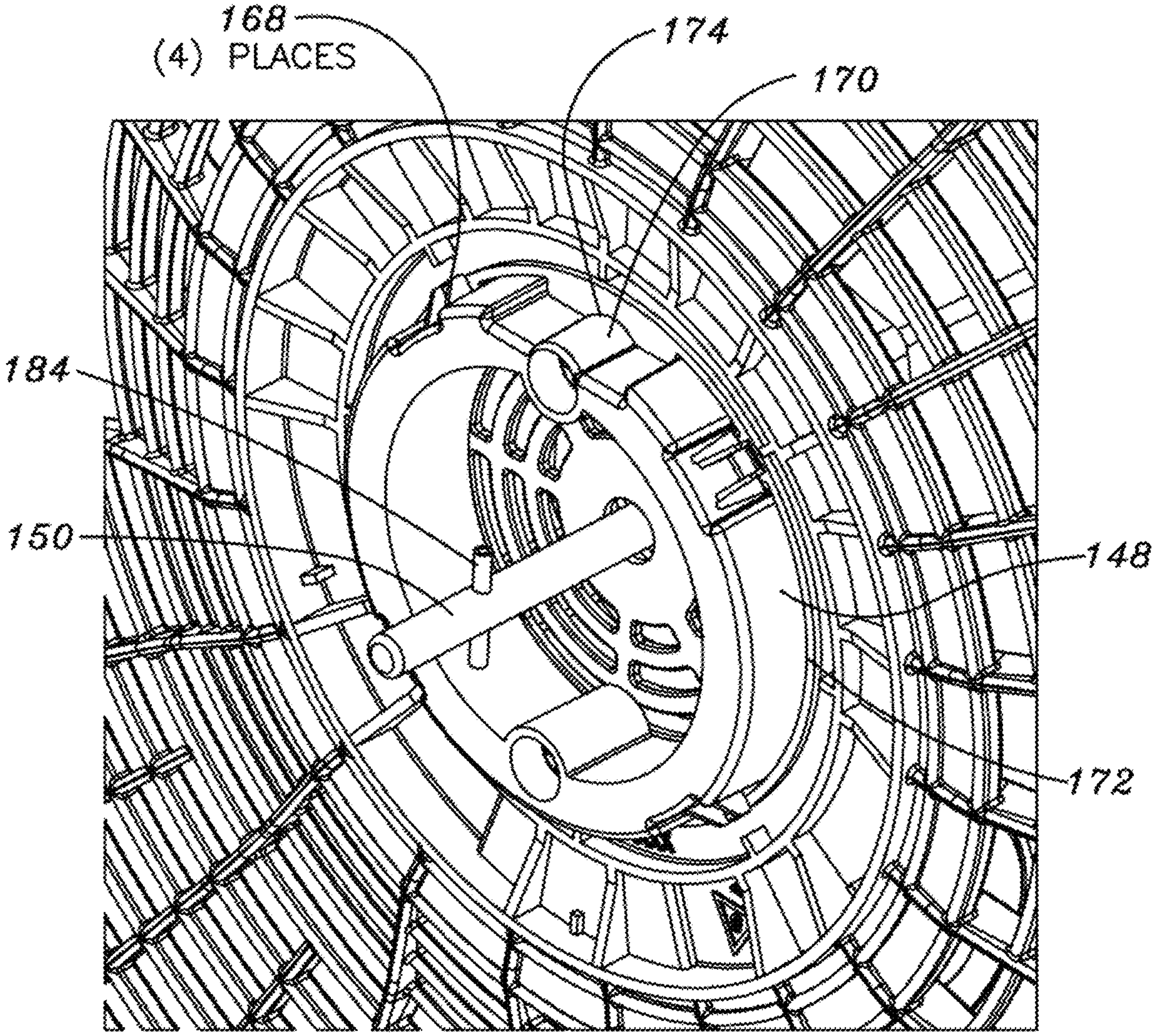

FIG. 7 and FIG. 8 illustrate an embodiment of the assembly interface between motor assembly 114 and rear grill 108 of a portable fan 100. FIG. 7 shows motor adaptor portion 148 of motor assembly 114 which may include multiple attachment structures 168 and location feature 170. Rear grill 108 may include center opening 172, location key 174 and grill openings 176. As can be seen attachment structures 168 and location feature 170 may be of unitary construction with motor adaptor portion 148. Also shown is rotational axis 180 which is aligned with the rotation of shaft 150 of motor assembly 114.

Rear grill 108 is moved relative to motor assembly 114 as per direction arrow 182 and parallel to rotational axis 180. As per FIG. 8 center opening 172 passes over motor adaptor portion 148 with location key 174 aligned to location feature 170 until attachment structures 168 are displaced and return to position on the inside of rear grill 108. Rear grill 108 is fully assembled to motor assembly 114 when attachment structures 168 return to position. In some embodiments, the full engagement of rear grill 108 and motor assembly 114 may provide an audible sound and/or a tactile engagement to indicate proper assembly. Also shown in FIG. 8 is pin 184 which passes through shaft 150 of motor assembly 114. With the features described above with respect to FIGS. 7 and 8, rear grill 108 and motor assembly 114 can be assembled absent the use of tools.

Figure 9:
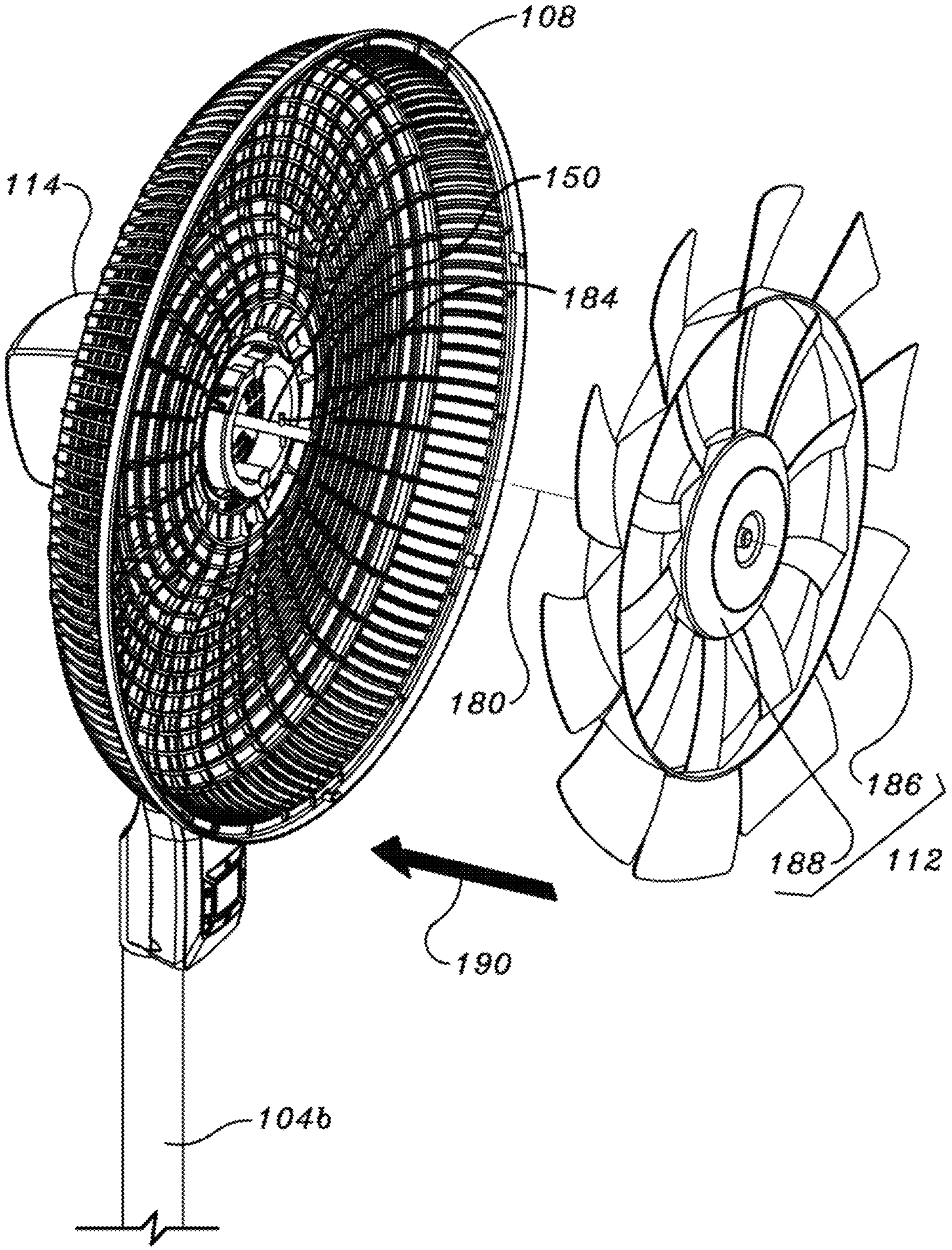
FIGS. 9, FIG. 10 and FIG. 11 illustrate an embodiment of the assembly interface between a motor assembly and an impeller of a portable fan utilizing the described system.
Figure 10:
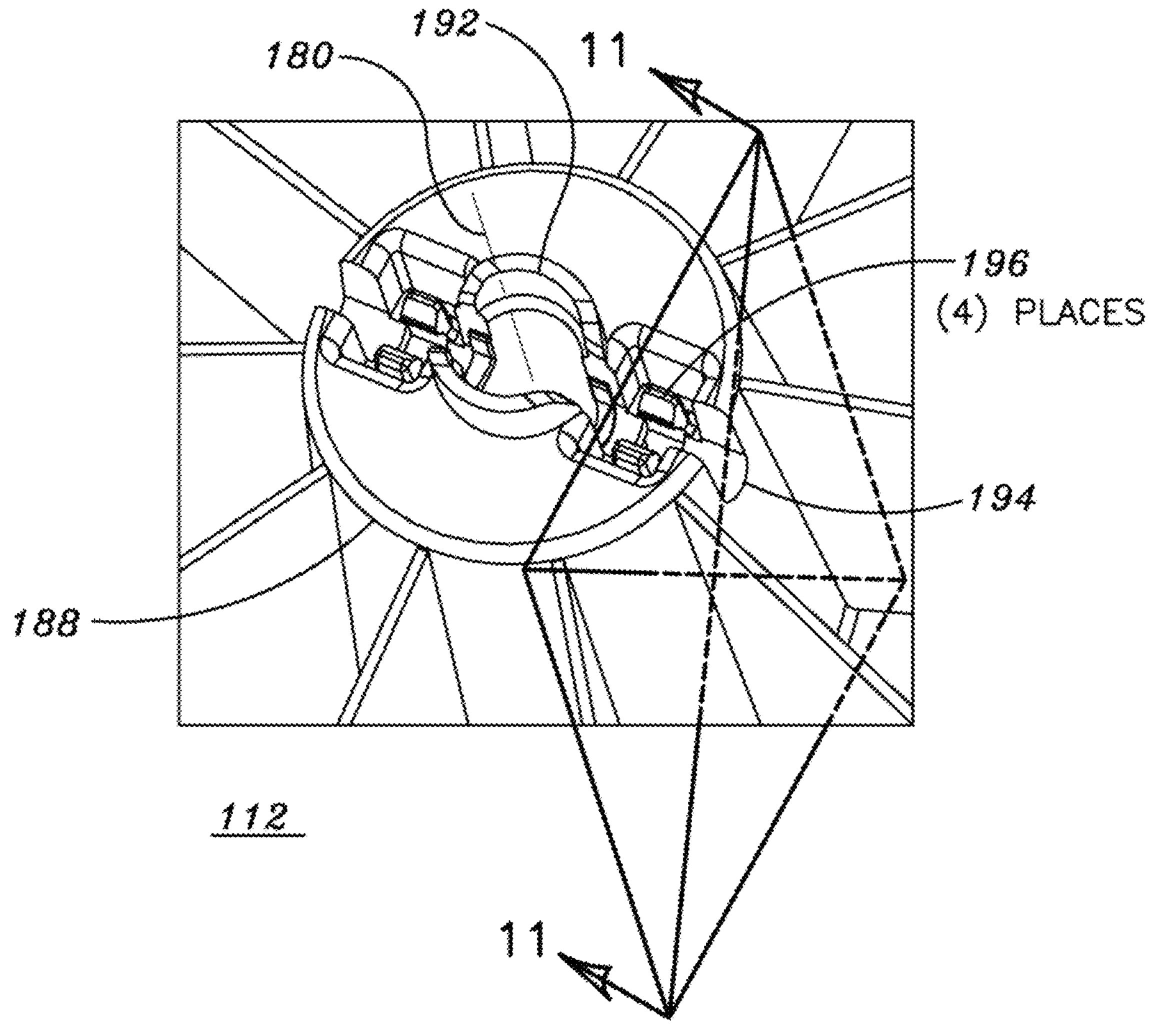
Figure 11:
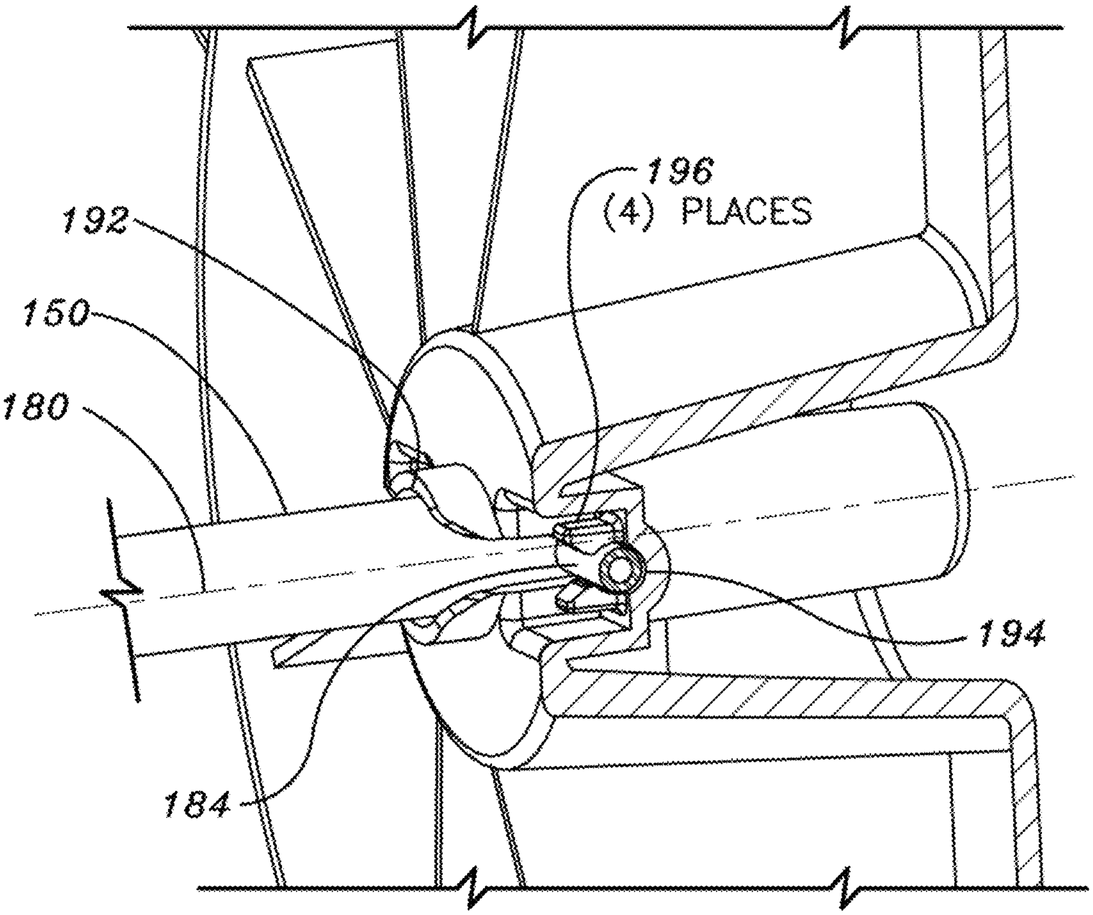

FIG. 9, FIG. 10 and FIG. 11 illustrate an embodiment of the assembly interface between motor assembly 114 and impeller 112. Impeller 112 includes multiple paddles 186 extending radially outward from central hub 188. Impeller 112 is moved relative to motor assembly 114 as per direction arrow 190 and parallel to rotational axis 180 to engage shaft 150.

FIG. 10 is a view of the back of center central hub 188 of impeller 112 showing impeller socket 192. The center of impeller socket 192 corresponds to rotational axis 180 of shaft 150. On opposite sides of impeller socket 192 are cavities 194 and retention fingers 196. Also shown is cross section plane 11-11.

FIG. 11 is an illustration of a view of section plane 11-11. As shown, when shaft 150 is inserted into impeller socket 192, pin 184 engages cavities 194 and retention fingers 196 to assemble impeller 112 connect to shaft 150. Fingers 196 are designed to displace from their natural position, and return to their natural position when pin 184 is fully engaged into cavities 194. In some embodiments, cavities 194 and retention fingers 196 may be formed as integral parts of impeller 112. With the features described above with respect to FIGS. 9-11, impeller 112 and shaft 150 can be assembled absent the use of tools.

Figure 12:
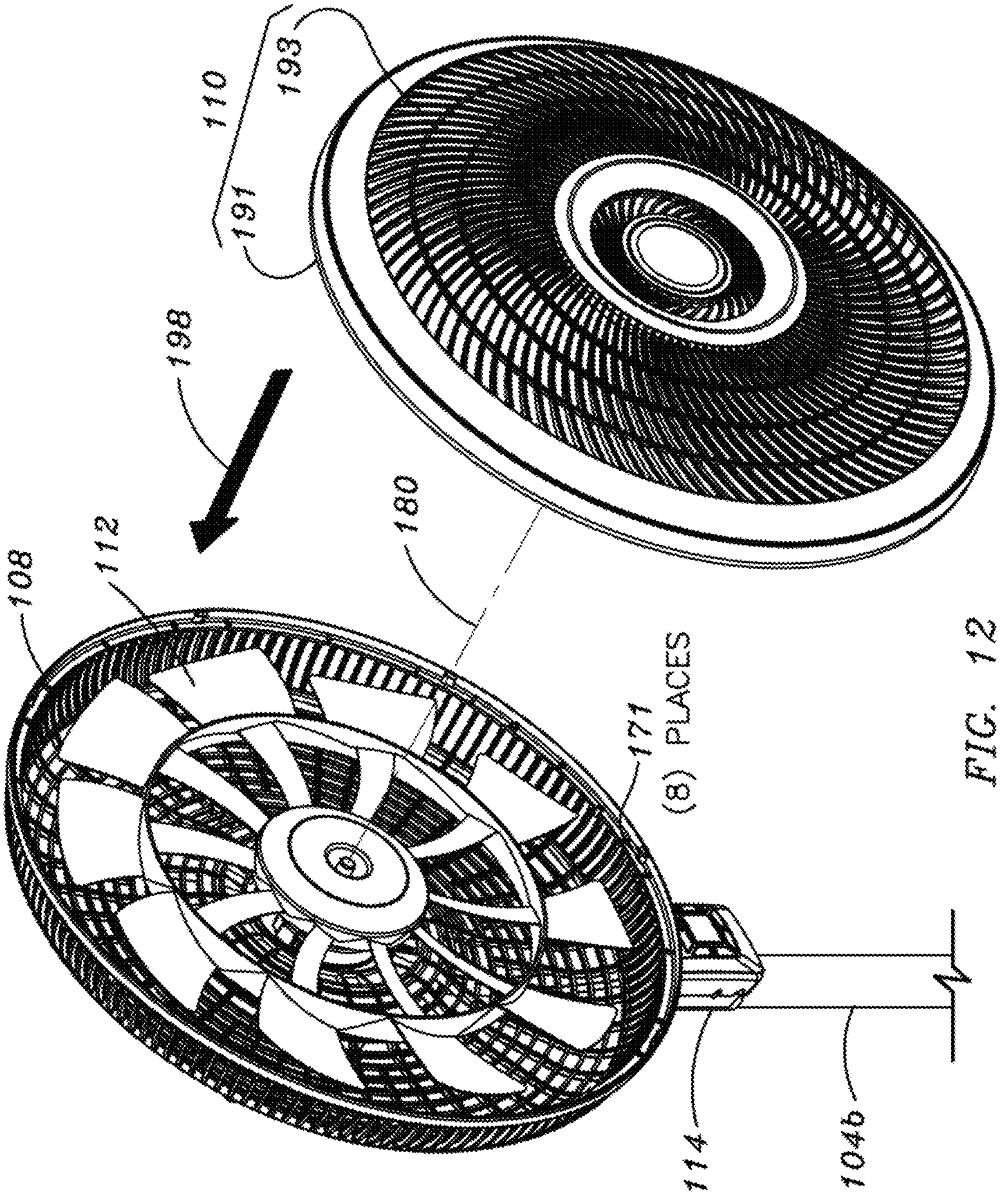
FIG. 12 and FIG. 13 illustrate an embodiment of the assembly interface between a rear grill and a front grill of a portable fan utilizing the described system.
Figure 13:
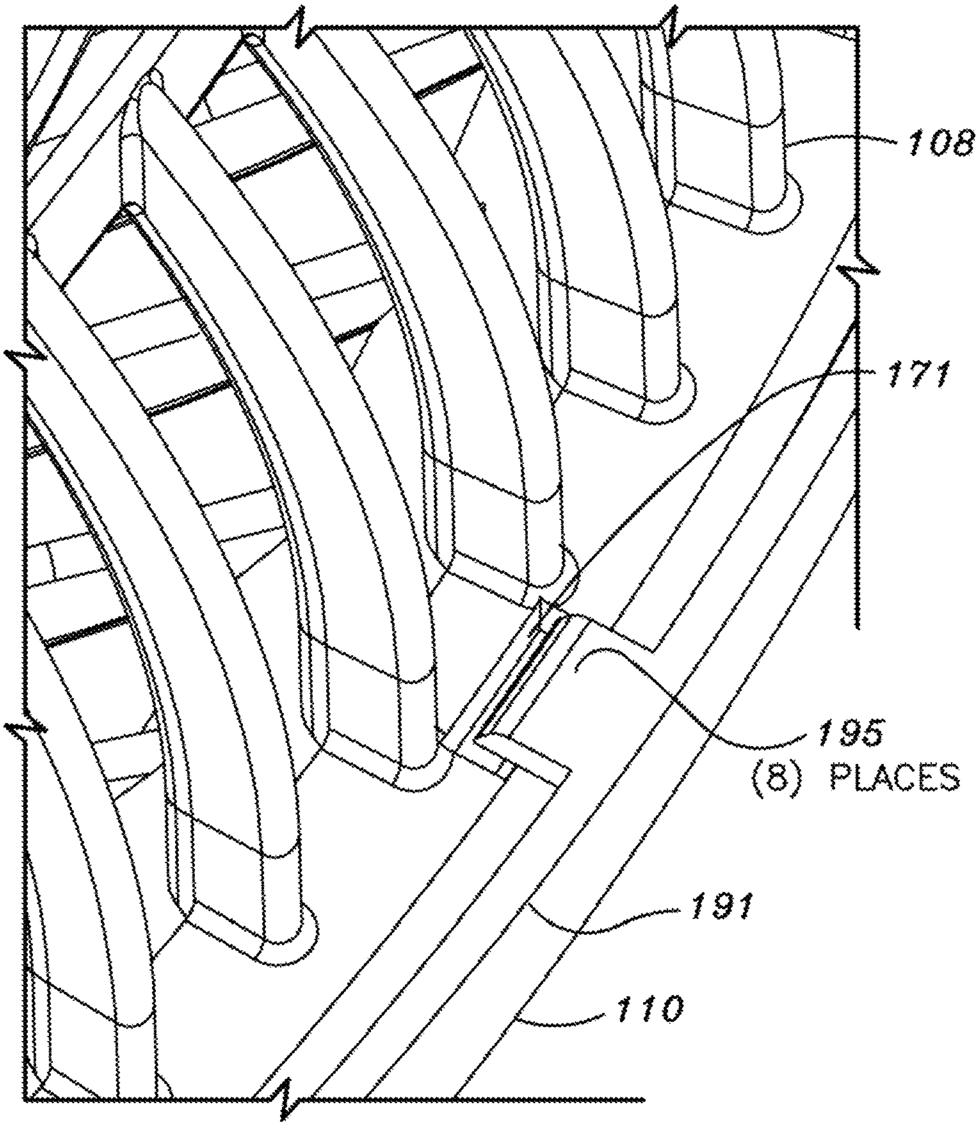

FIG. 12 and FIG. 13 illustrate an embodiment of the assembly interface between rear grill 108 and front grill 110 of a portable fan 100. Front grill 110 includes multiple grill openings 193 and a circumferential edge 191 conforming to the size and shape of rear grill 108. As shown rear grill 108 also includes multiple attachment structures 171 proximate an outer circumference of rear grill 108. Front grill 110 is moved relative to rear grill 108 as per direction arrow 198 and parallel to rotational axis 180 to engage rear grill 108.

FIG. 13 is a view of the back of circumferential area of front grill 110 and rear grill 108 in area of circumferential edge 191. Front grill 110 includes fingers 195 protruding radially inward along circumferential edge 191 and corresponding to attachment structures 171 of rear grill 108. As shown, when front grill 110 is fully assembled to rear grill 108 fingers 195 interface with attachment structures 171 to keep the rear/front grills 108/110 connected. With the features described above with respect to FIGS. 12 and 13, rear/front grills 108/110 can be assembled absent the use of tools.

Figure 14C:
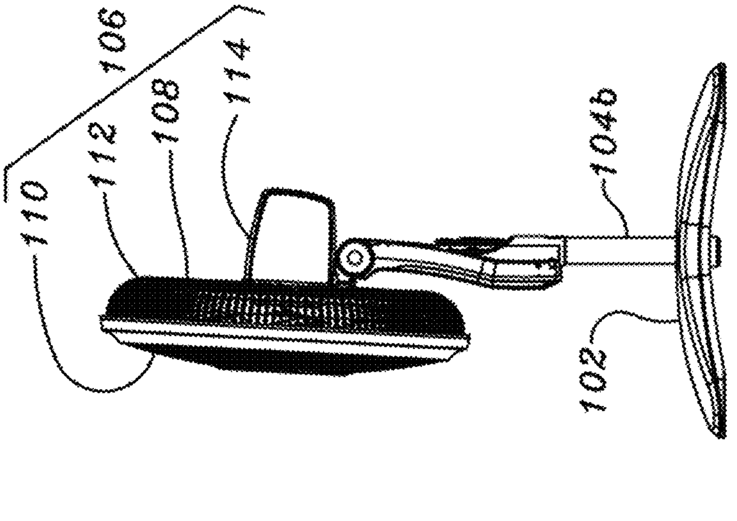
FIGS. 14*a*, 14*b*, and 14*c* illustrate an embodiment of multiple height configurations of a portable fan utilizing the described system.
Figure 14B:
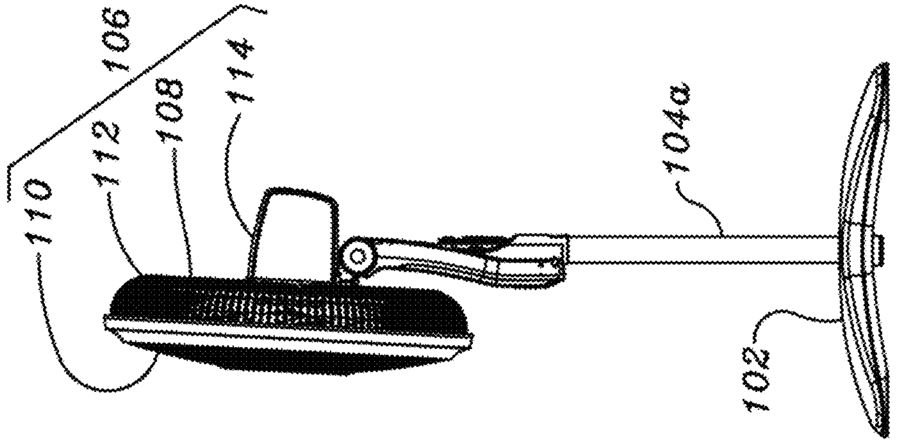
Figure 14A:
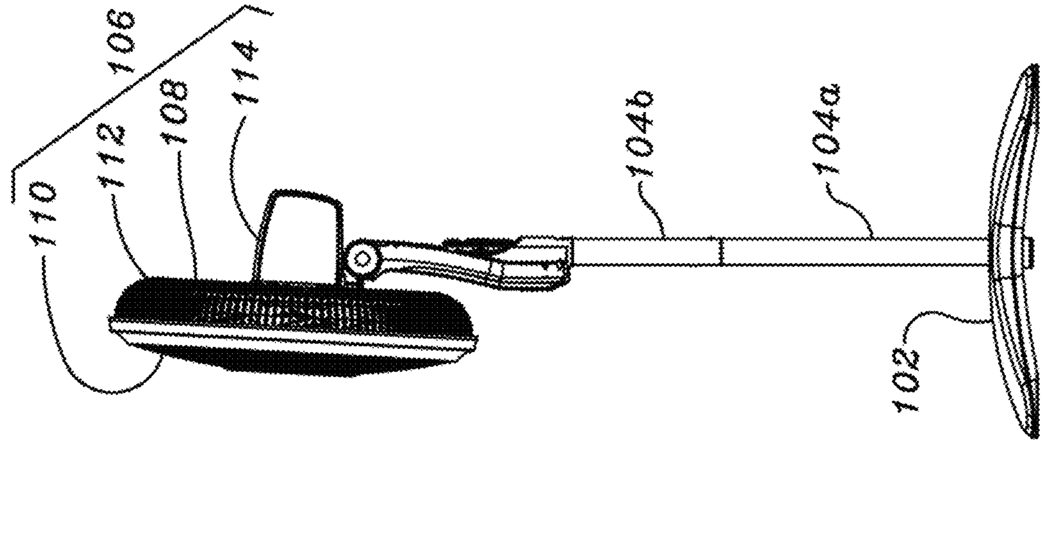

FIGS. 14*a*, 14*b*, and 14*c* illustrate the ability to adjust height of portable fan 100. The elevation of air generation assembly 106 relative to base 102 can be adjusted by variably using lower portion 104*a* and upper portion 104*b* of extension 104. As shown in the present embodiment the vertical length of lower portion 104*a* can be greater than the vertical length of upper portion 104*b*.

FIG. 14*a* utilizes both lower portion 104*a* and upper portion 104*b* to maximize the elevation of air generation assembly 106 relative to base 102. FIG. 14*b* utilizes only lower portion 104*a* to configure a medium elevation of air generation assembly 106 relative to base 102. In other words, in FIG. 14*b*, the upper portion 104*b* is removed, and the lower portion 104*a* is attached to the motor assembly 114 of a portable fan 100 by interlocking the lower portion's 104*a* outward protrusion with the motor assembly's 114 hole 156. FIG. 14*c* utilizes only upper portion 104*b* to configure the minimum elevation of air generation assembly 106 relative to base 102. In other words, in FIG. 14*c*, the lower portion 104*a* is removed, and the upper portion 104*b* is attached to the base 102 by interlocking the upper portion's 104*b* hole 142 with the base's 102 protrusion 132. In this way, the various connections between air generation assembly 106, lower/upper portions 104*a*/104*b*, and base 102 can be assembled absent the use of tools.

In some embodiments, base 102, motor adaptor 126, motor adaptor 160, motor extension 152, motor cover 146, motor adaptor portion 148, rear grill 108 and front grill 110 may be constructed of a polymer. Polymer can allow a maximum quantity of the various attachment features to be incorporated and integral into the structures of these components and thereby eliminate the need for additional fasteners or special components to achieve the described assembly.

Figure 15:
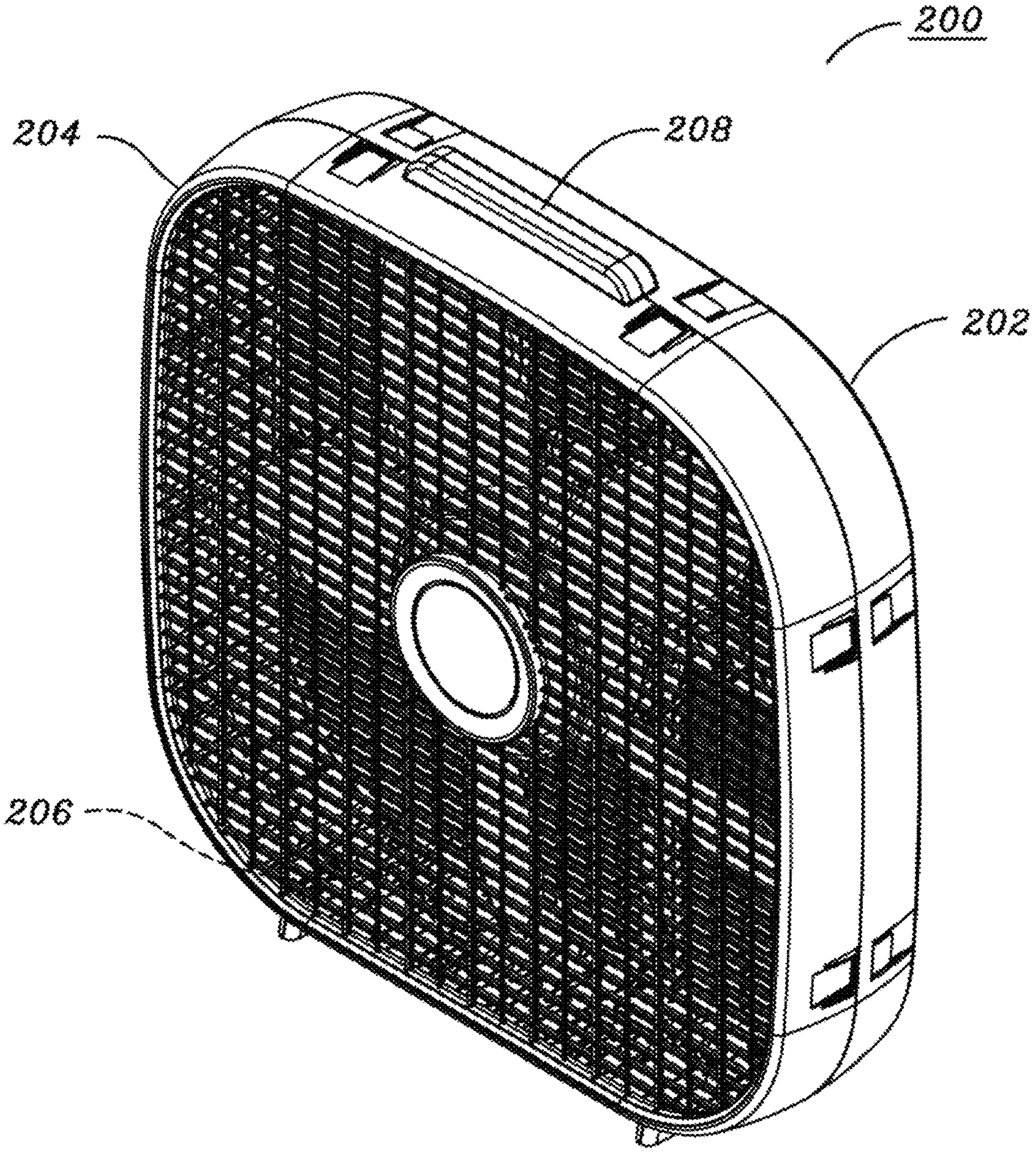
FIG. 15 is another embodiment of a fully assembled portable fan utilizing the described structure.

FIGS. 15-18 illustrate another embodiment of a fan. FIG. 15 is a front perspective view of fully assembled fan 200 utilizing the described assembly structure, according to an embodiment of the present disclosure. In some embodiments, the fan 200 includes a front body 204, rear body 202, impeller 206 (located in an internal space created by assembled front body 204, rear body 202) and handle feature 208 on the top of the fan 200.

Figure 16:
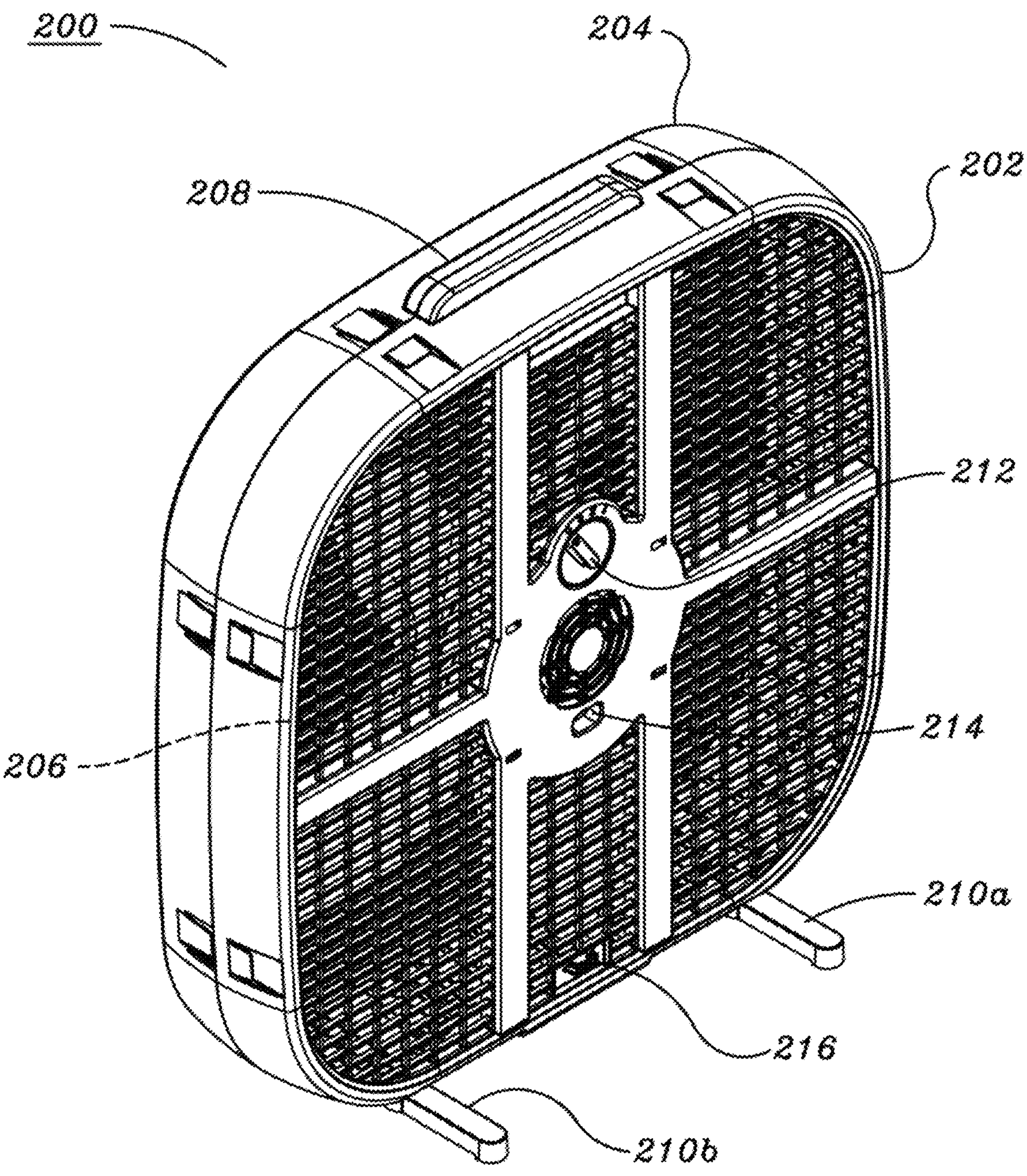
FIG. 16 is a rear perspective view of a fully assembled portable fan utilizing the described structure, according to an embodiment of the present disclosure.

FIG. 16 is a rear perspective view of fan 200, according to an embodiment of the present disclosure. In some embodiments, fan 200 includes stabilization supports 210*a* and 210*b*, control knob 212, power cord opening 214, and integrated power cord hook 216.

Figure 17:
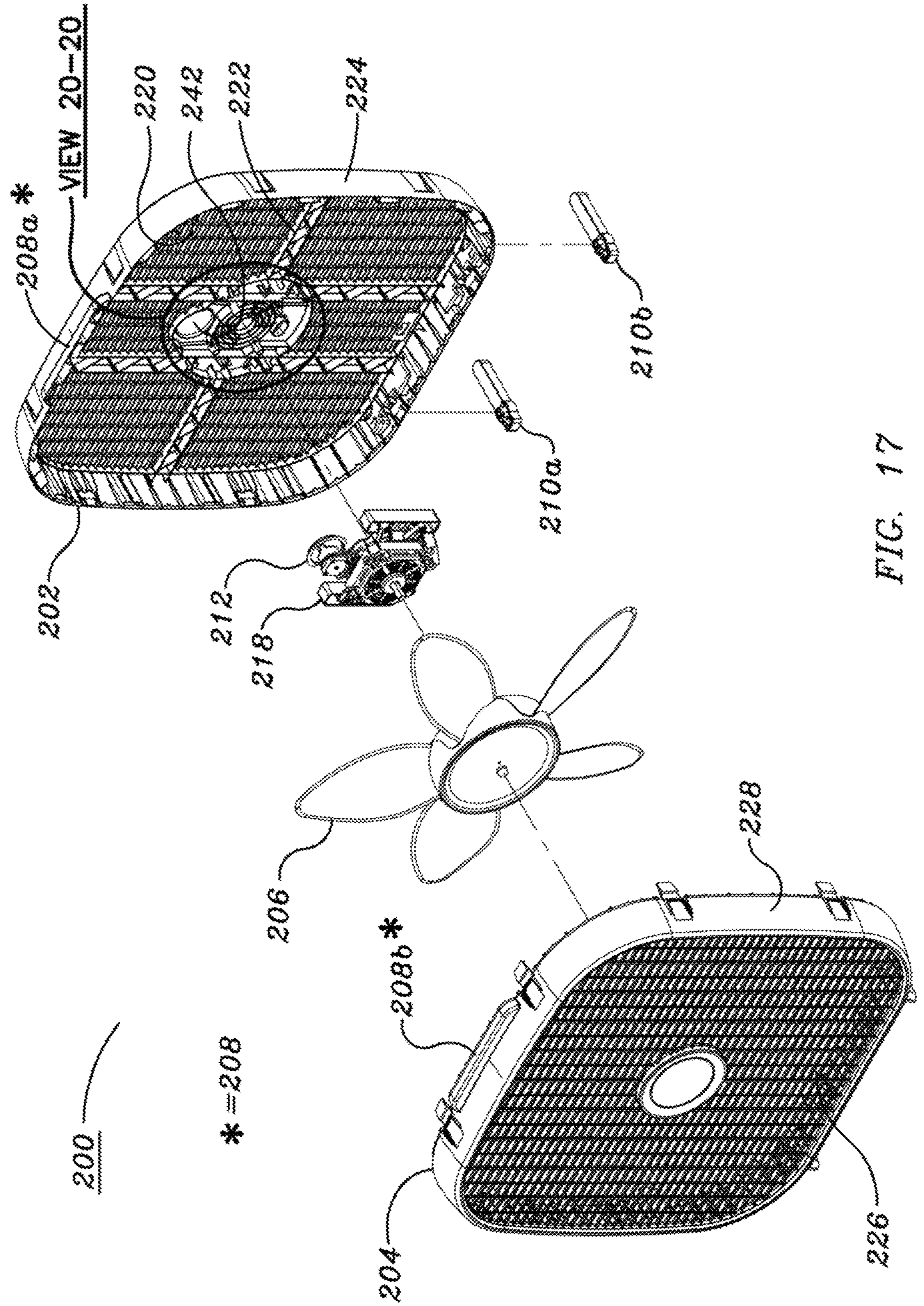
FIG. 17 is an exploded perspective view of a fully assembled portable fan utilizing the described structure, according to an embodiment of the present disclosure.

FIG. 17 is an exploded perspective view of fan 200, according to an embodiment of the present disclosure. Impeller 206 can be connected and rotated by motor assembly 218. Impeller 206 and motor assembly 218 can be located within the interior space created by assembled rear body 202 and front body 204. Control knob 212 can be accessible through control opening 242 of rear body 202. Rear body 202 can include grill openings 220, outer frame 224 and handle portion 208*a*. Front body 204 can include grill openings 226, outer frame 228 and handle portion 208*b*. Stabilization supports 210*a* and 210*b* can be rotatably connected to rear body 202.

Figure 18A:
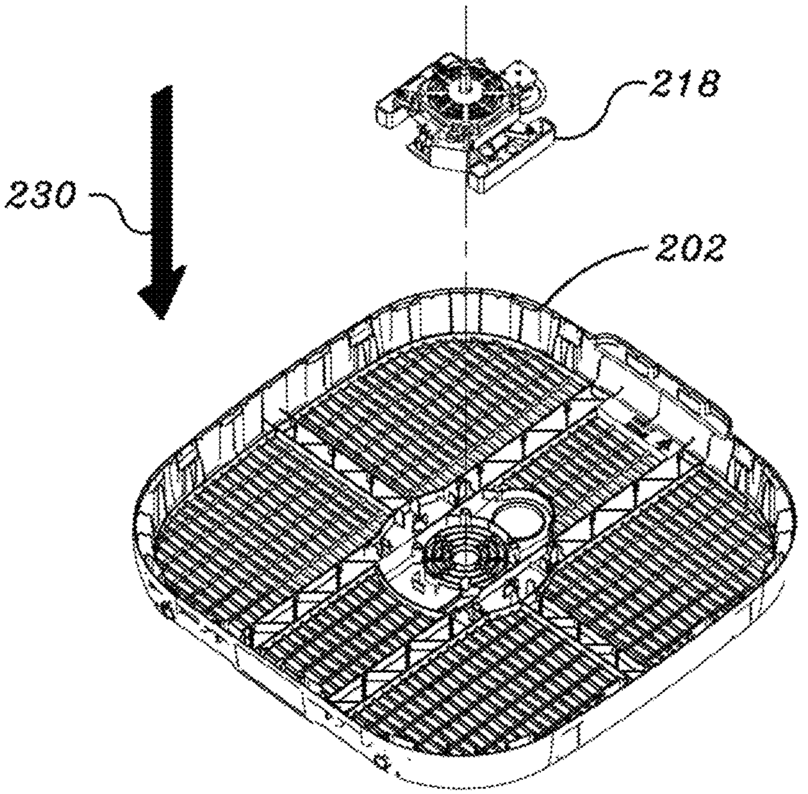
FIG. 18*a* and FIG. 18*b* illustrate an embodiment of the assembly interface between a motor assembly, a motor bracket and a rear body of a fan utilizing the described structure.
Figure 18B:
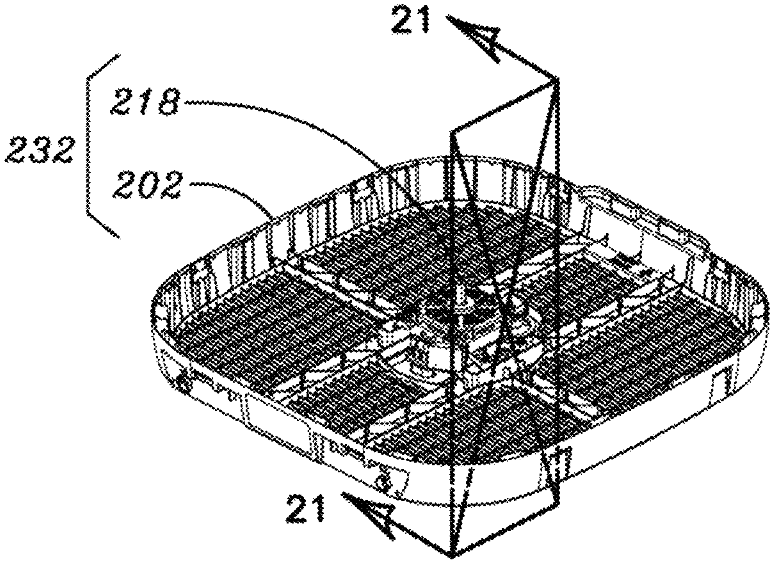
Figure 19:
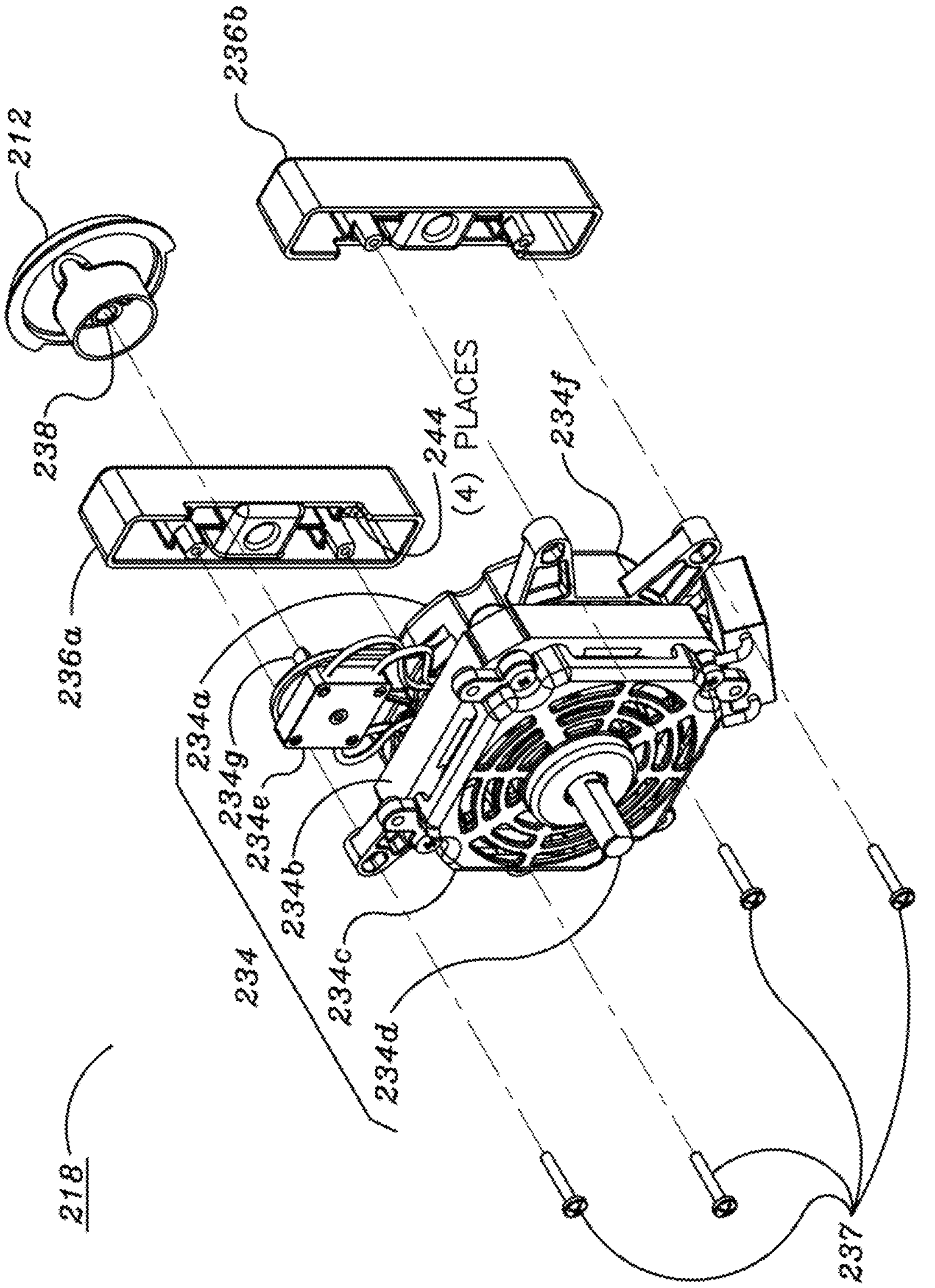
FIG. 19 is an exploded perspective view of the motor assembly of a portable fan utilizing the described structure, according to an embodiment of the present disclosure.
Figure 20:
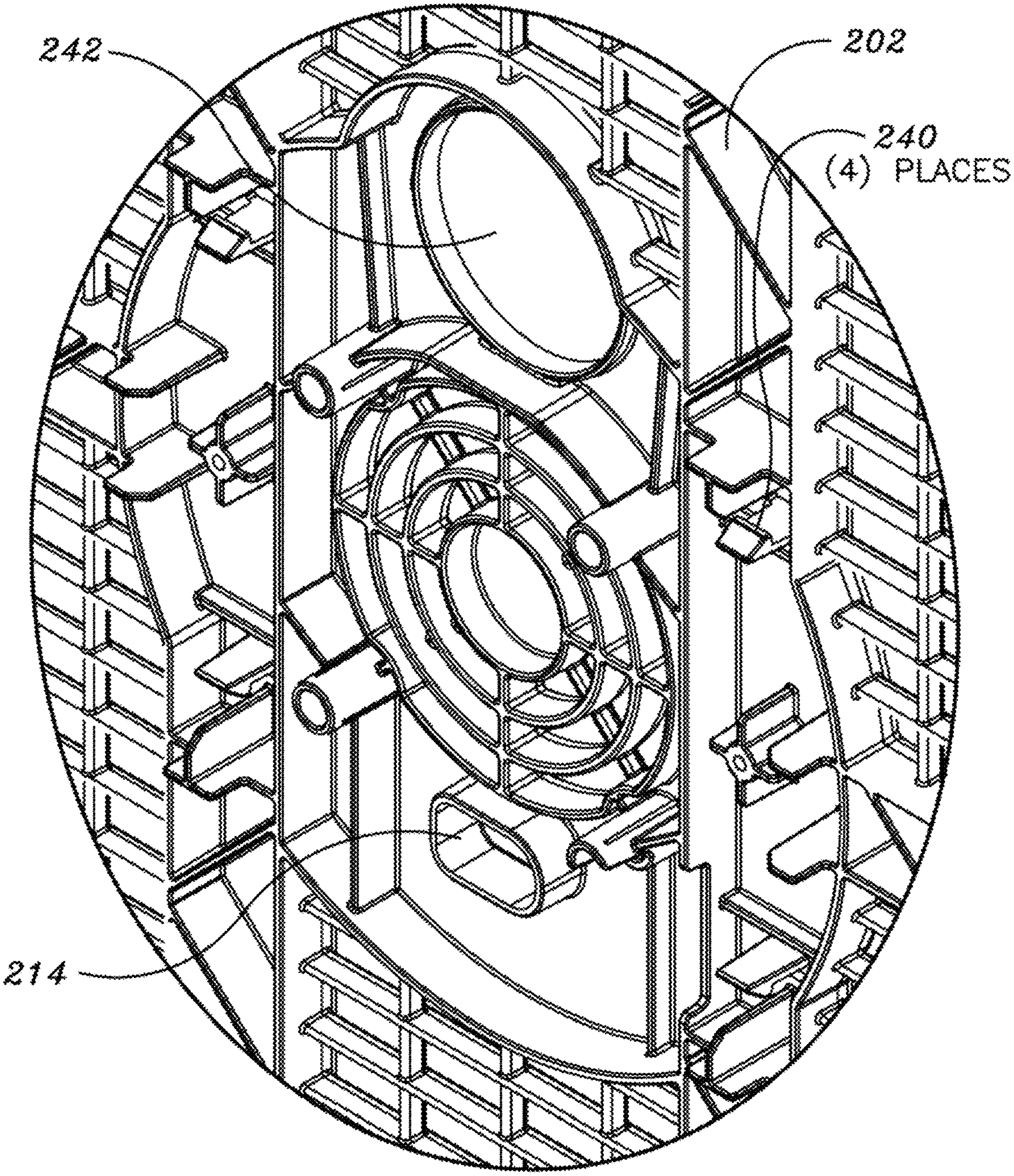
FIG. 20 is a view of mounting features for a motor assembly of a portable fan utilizing the described structure, according to an embodiment of the present disclosure.
Figure 21:
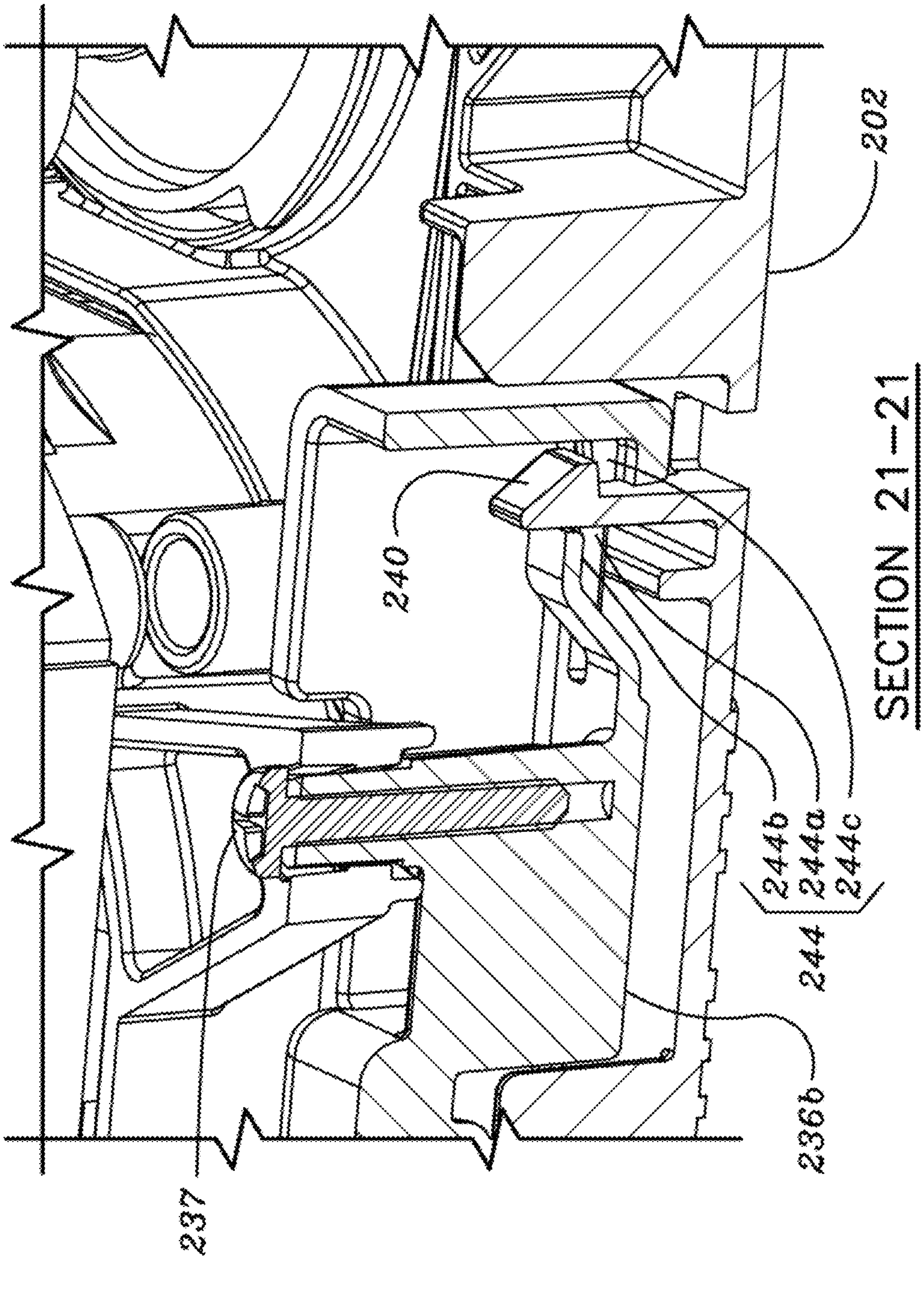
FIG. 21 is a cross-sectional view of mounting features for a motor assembly of a portable fan utilizing the described structure, according to an embodiment of the present disclosure.

FIGS. 18*a*-26 illustrate the tool-free assembly of a fan 200, according to embodiments of the present disclosure. FIGS. 18*a* and 18*b* show assembly step one, according to an embodiment of the present disclosure. At step one, in some embodiments, motor assembly 218 can be moved in the direction shown by arrow 230 to engage and connect to rear body 202. FIG. 18*b* shows sub-assembly 232 which include motor assembly 218 and rear body 202. Also shown is cross-section plane 21-21, the view of which is shown in FIG. 21.

FIG. 19 is an exploded view of motor assembly 218, according to an embodiment of the present disclosure. Motor 234 can include rear housing 234*a*, stator 234*b*, front housing 234*c*, rotor shaft 234*d*, speed selection switch 234*e* and electric port 234*f* located on the rear of motor 234. Speed selection switch 234*e* can include stem 234*g* which connects to control knob 212 via socket 238. Mounting portions 236*a* and 236*b* can be connected to motor 234 by multiple screws 237 or other fasteners. Mounting portions 236*a* and 236*b* can include multiple attachment features 244, as discussed in further detail with respect to FIG. 21.

FIG. 20 is view 20-20 (see FIG. 17) showing multiple motor mounting features 240, control opening 242, power cord opening 214 which are integrated with the structure of rear body 202. Power cord opening 214 can align with electric port 234*f* of motor assembly 218 when rear body 202 and motor assembly 218 are connected.

FIG. 21 is cross-sectional view 21-21 (see FIG. 18*b*) showing the interface between attachment feature 244 and rear body 202 motor mounting features 240. As shown multiple attachment features 244 can include opening 244*a*, retainer 244*b* and clip feature 244*c*. When mounting portions 236*a* and 236*b* are aligned and moved in the direction shown by 230, multiple motor mounting features 240 can pass through openings 244*a*, while retainers 244*b* can be displaced allowing mounting features 240 to overlap clip features 244*c*. When motor assembly 218 is fully assembled with rear body 202 retainer 244*b* prevents mounting features 240 from disengaging with clip feature 244*c*.

Figure 22A:
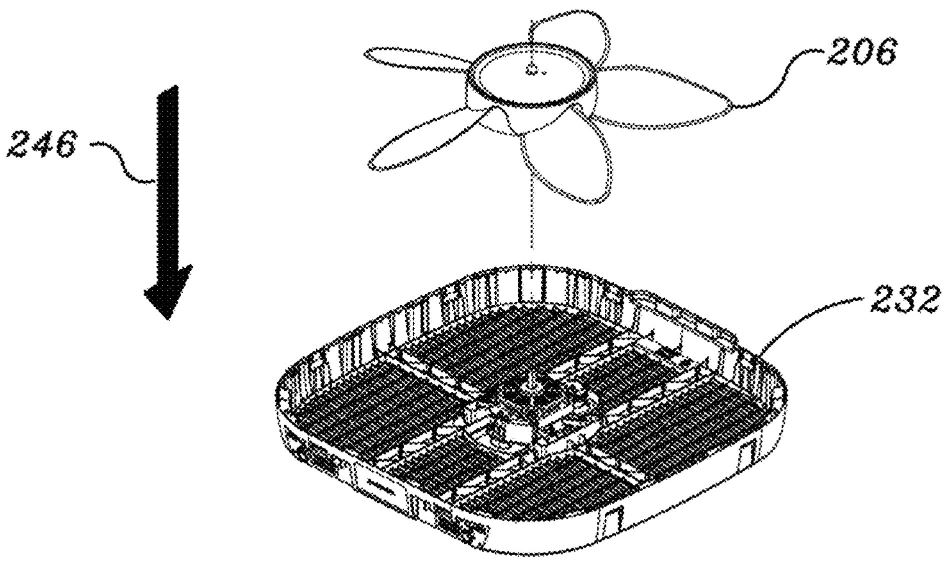
FIG. 22*a* and FIG. 22*b* illustrate the assembly of an impeller to a motor assembly.
Figure 22B:
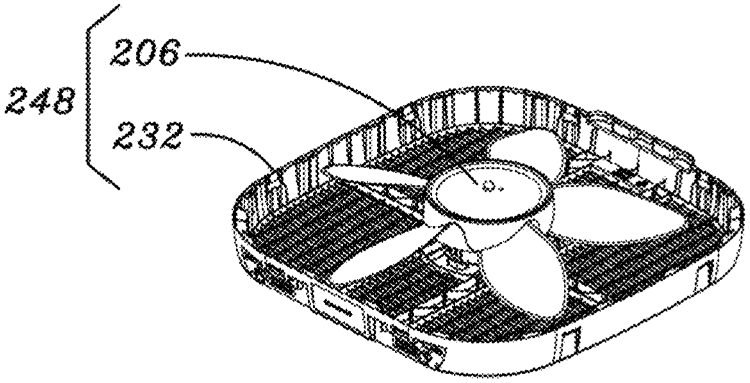

FIGS. 22*a* and 22*b* shows assembly step two, according to an embodiment of the present disclosure. In some embodiments, at assembly step two, impeller 206 can be moved in the direction shown by arrow 246 to engage and connect to sub-assembly 232. FIG. 22*b* shows sub-assembly 248 which can include sub-assembled 232 and impeller 206.

Figure 23A:
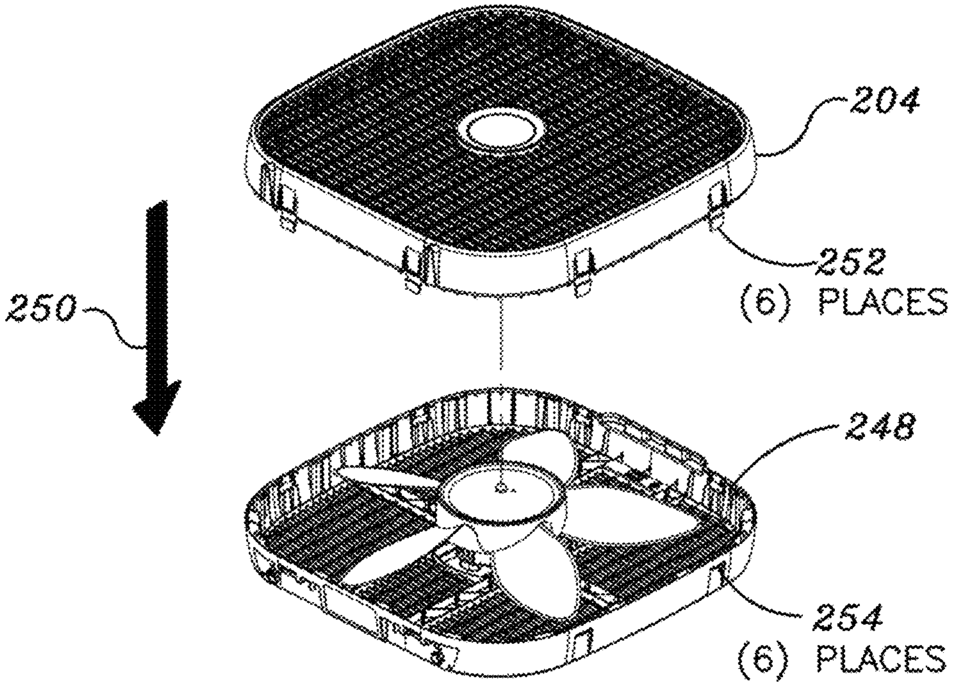
FIG. 23*a* and, FIG. 23*b* illustrate an embodiment of the assembly interface between a front body and a rear body of a fan utilizing the described structure.
Figure 23B:
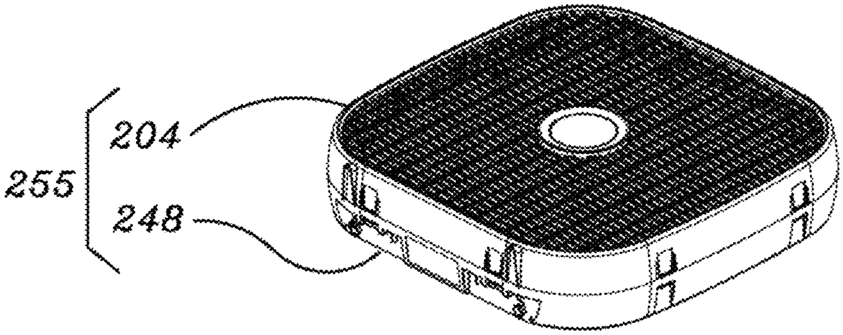

FIGS. 23*a* and 23*b* show assembly step three, according to an embodiment of the present disclosure. In some embodiments, at assembly step three, impeller front body 204 can be moved in the direction shown by arrow 250 to engage and connect to sub-assembly 248. FIG. 23*b* shows sub-assembly 255 which can include sub-assembled 248 and front body 204. Front body 204 can include multiple assembly extensions 252 and sub-assembled 248 includes multiple corresponding assembly receptacles 254.

Figure 24A:
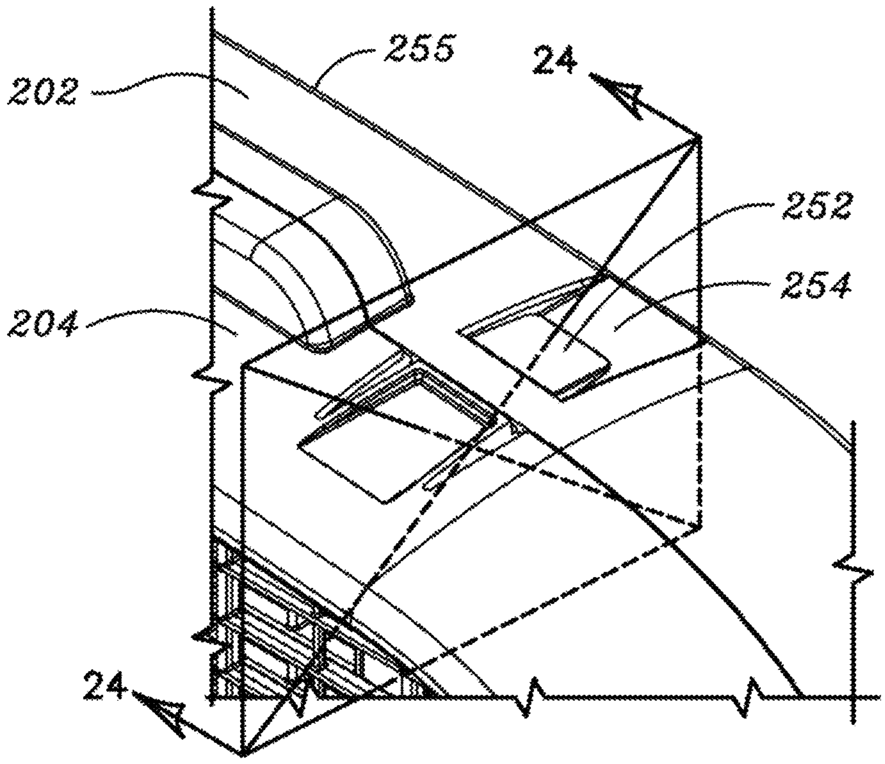
FIGS. 24*a* and 24*b* illustrate connection details between a front body and a rear body, according to an embodiment of the present disclosure.
Figure 24B:
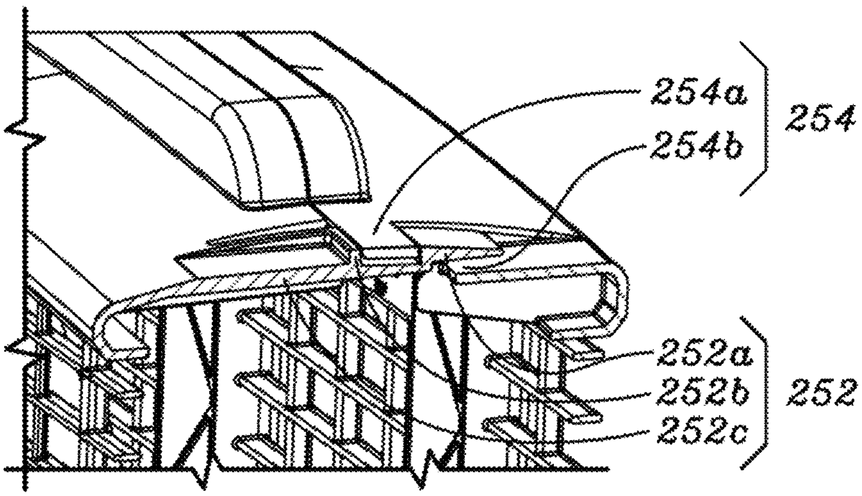

FIGS. 24*a* and 24*b* illustrate interface between extensions 252 and receptacles 254, according to an embodiment of the present disclosure. Cross section plane 24-24 of FIG. 24*a* is shown in FIG. 24*b*. Extension 252 can include retention clip 252*a*, retention wall 252*b* and cantilever 252*c*. Receptacle 254 can include bale 254*a* and opening 254*b*. When multiple extensions 252 and multiple receptacles 254 are aligned and moved in the direction shown by arrow 250, retention clips 252*a* pass through corresponding openings 254*b*. Cantilever 252*c* can allow retention clip 252*a* to pass below bale 254*a* and return to position thereby entrapping bale 254*a* between retention clip 252*a* and retention wall 252*b* connecting front body 204 to sub-assembly 248. Front body 204 and sub-assembly 248 can be disassembled via applying pressure to retention clip 252*a* and/or cantilever 252*c* to move retention clip 252*a* below bale 254*a* while moving front body 204 away from sub-assembly 248.

Figure 25:
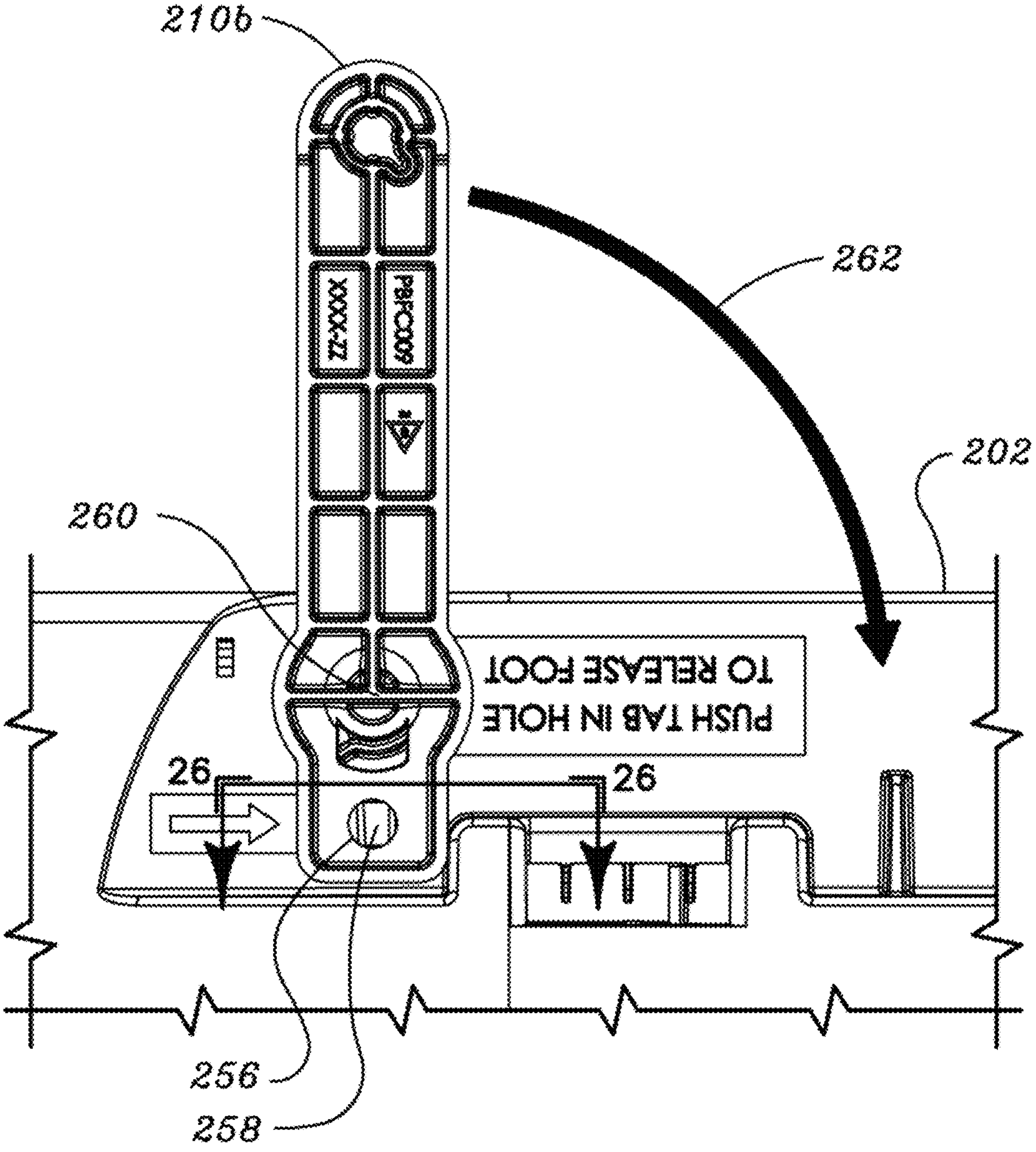
FIG. 25 and FIG. 26 illustrate an embodiment of an interface between stabilization feet and a rear body of a fan utilizing the described structure.
Figure 26:
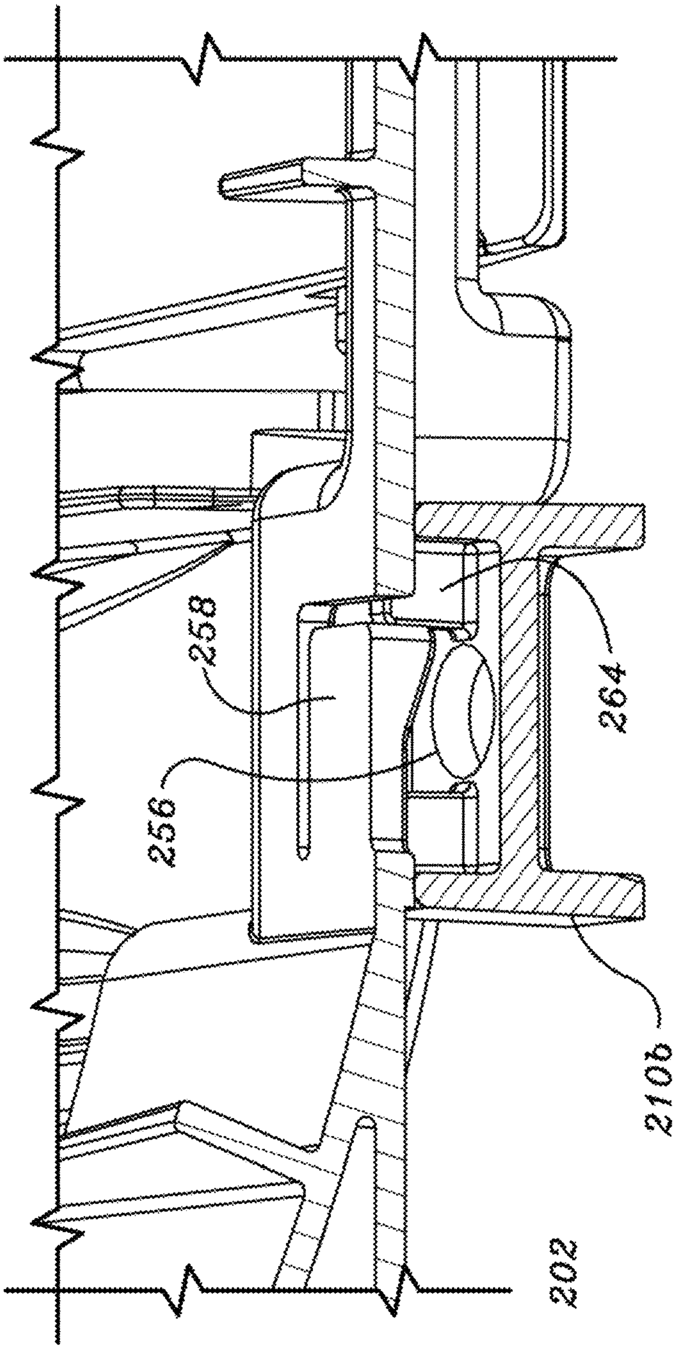

FIG. 25 and FIG. 26 illustrate interface between stabilization feet 210*a*/210*b* and the rear body 202, according to an embodiment of the present disclosure. FIG. 24 shows the stabilization foot 210*b* in the operational position, according to an embodiment of the present disclosure. In some embodiments, foot snap 258 can be accessed by the end user via release access hole 256 to allow stabilization foot 210*b* to rotate around pivot center 260 along path 262 to the storage configuration. Also shown is cross-section plane 26-26, the view of which is shown in FIG. 26.

FIG. 26 is a detailed cross section 26-26 of FIG. 25 showing the release access hole 256 in stabilization foot 210*b* which allows end user access to foot snap 258. Also shown is foot lock 264 which can maintain the foot in the operational position until foot snap 258 is moved. As shown release access hole 256 can require the use of a tool to access and move foot snap 258. Once foot snap 258 is moved out of the position with a tool foot 210*b* can be rotated into storage configuration. The required use of a tool to move foot snap 258 allows fan 200 to conform with industrial and product compliance standards. As shown foot lock 264 and foot snap 258 can be integrated within the structure of rear body 202.

In some embodiments, a fan 200 is in its storage configuration when the stabilization feet 210*a*/210*b* are rotated into a position within the profile and perimeter rear body 202. The storage configuration can allow fan 200 to be contained in a smaller carton compared to when in operational position when the stabilization feet 210*a*/210*b* are rotated out from within the profile and perimeter rear body 202. As shown, in some embodiments, the shape of the assembled front body 204 and rear body 202 will not permit fan 200 to stand up as needed for proper operation (see FIG. 16) absent the rotation of stabilization feet 210*a*/210*b* from the storage configuration to the operational position. This feature assures that the required stability and safety is achieved when the fan 200 is in use.

Illustrated in FIGS. 18*a*, 18*b*, 22*a*, 22*b*, 23*a*, and 23*b*, along with the deployment of the stabilization feet 210*a*/210*b*, show the tool-free assembly sequence of fan 200, according to embodiments of the present disclosure. The assembly sequence can be unidirectional and may not require re-orientation of fan 200 during assembly. This features make it easier to automate the assembly process and thereby lower the manufacturing cost of the product.

Figure 27:
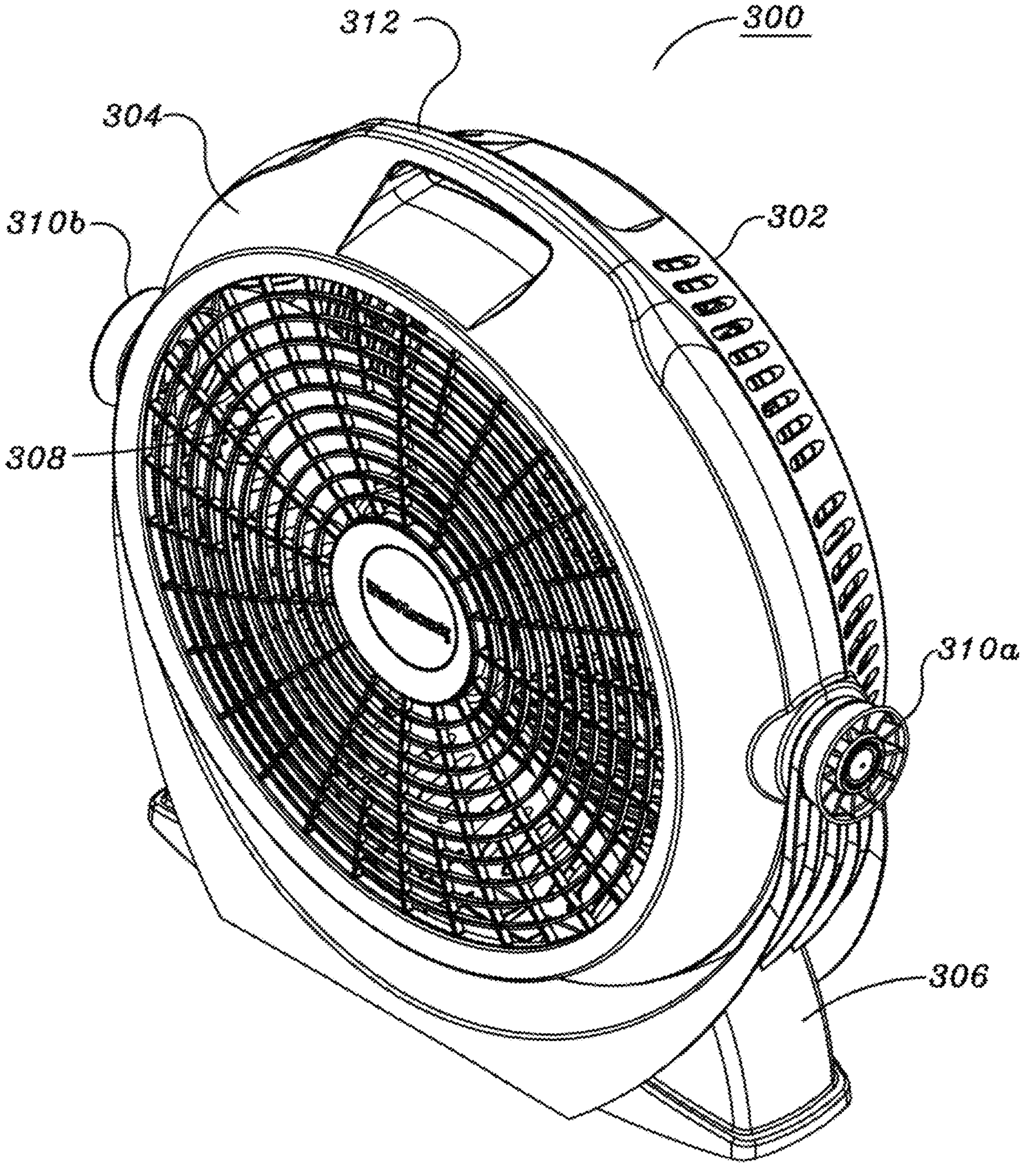
FIG. 27 is a front right-side perspective view of another embodiment of a fan utilizing the described structure.

FIG. 27 is an embodiment of fan 300 utilizing the described assembly structure, according to an embodiment of the present disclosure. The fan 300 can include a rear body 302, front body 304, base 306, impeller 308, pivot knobs 310*a* and 310*b*. Handle feature 312 can be incorporated into rear body 302 and front body 304.

Figure 28:
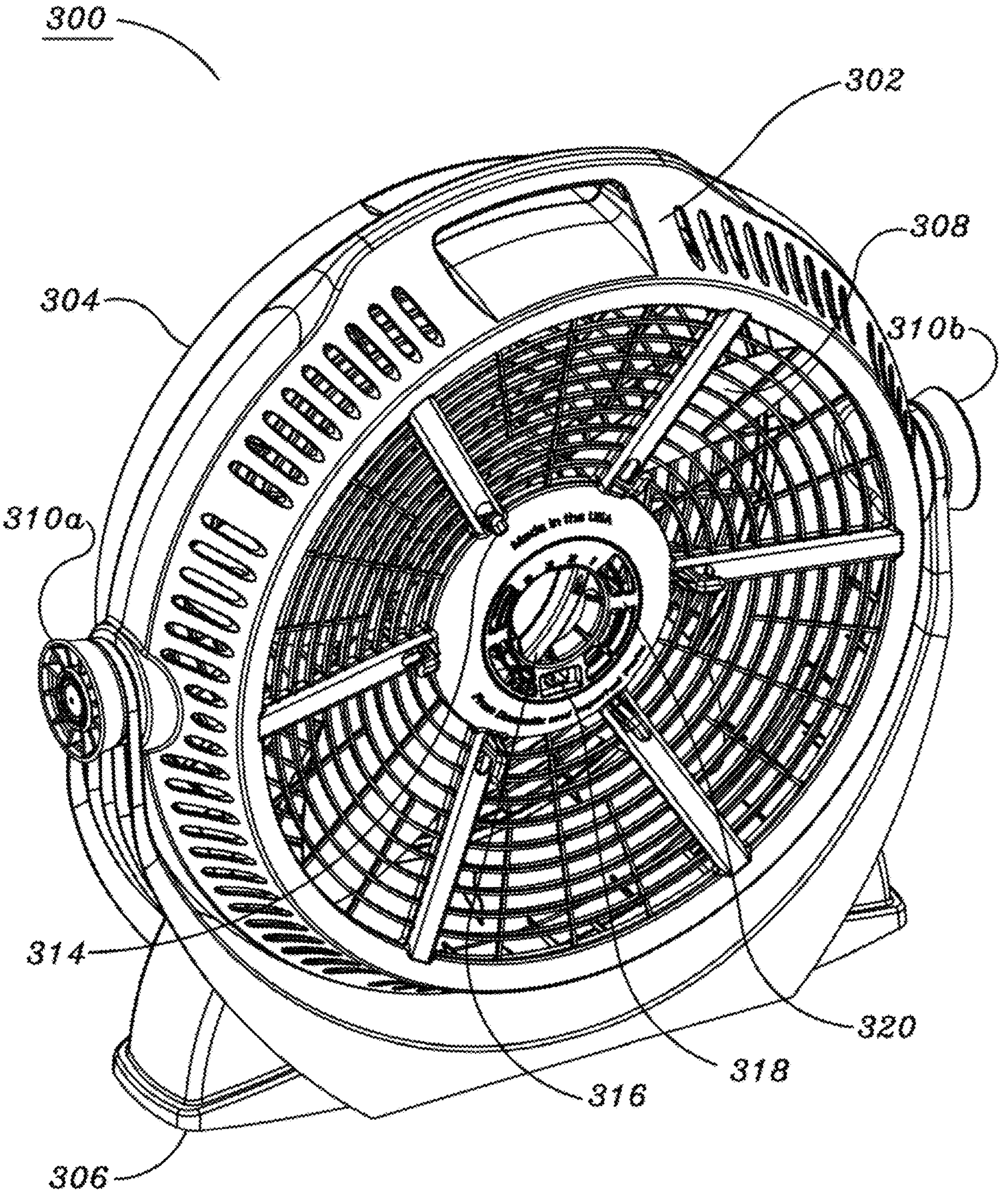
FIG. 28 is a rear left-side perspective view of a fan utilizing the described structure, according to an embodiment of the present disclosure.

FIG. 28 is a rear left-side perspective view of fan 300, according to an embodiment of the present disclosure. Motor assembly 320 can be attached to rear body 302 and can include power cord port 318 and speed selection knob 316. Also shown are power cord storage hooks 314 that can be incorporated into the structure of rear body 302.

Figure 29:
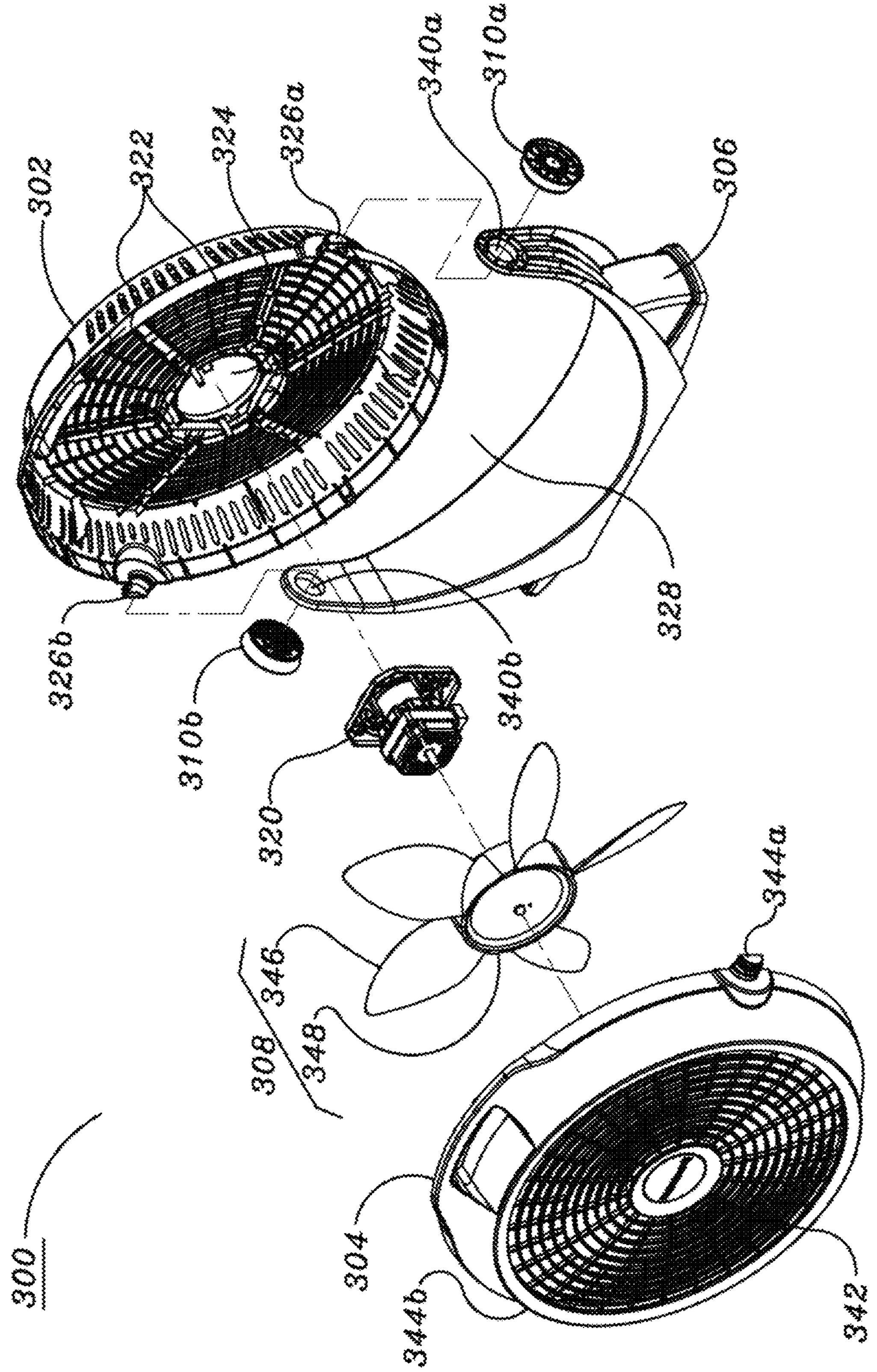
FIG. 29 is an exploded view of a fan utilizing the described structure, according to an embodiment of the present disclosure.

FIG. 29 is an exploded view of fan 300, according to an embodiment of the present disclosure. Rear body 302 and front body 304 can connect to each other to define an internal space. Located within the internal space can be motor assembly 320 and impeller 308. Rear body 302 and front body 304 can be rotationally attached to base 306 using pivot knobs 310*a* and 310*b*.

Rear body 302 can include multiple air passages 322, motor opening 324 and posts 326*a* and 326*b* located on opposite circumferential sides of rear body 302. Front body 304 can include multiple air passages 342, and posts 344*a* and 344*b* located on opposite circumferential sides of front body 304. Posts 326*a* and 326*b* on rear body 302 and posts 344*a* and 344*b* on front body 304 can be located relative to each other when rear body 302 and front body 304 are assembled. These structures can be integrated into the respective rear body 302 and front body 304.

Motor assembly 320 can connect to rear body 302 and impeller 308. Impeller 308 can be an axial type of impeller and include hub 348 and multiple paddles 346 extending radially outward from hub 348. End users access to power cord port 318 and speed selection knob 316 can be facilitated through motor opening 324. When energized motor assembly 320 can rotate impeller 308.

Base 306 can include post holes 340*a* and 340*b*. Rear body 302 and front body 304 can be positioned in yoke area 328 and posts 326*a* and 326*b* and posts 344*a* and 344*b* pass through respective post holes 340*a* and 340*b*. Pivot knobs 310*a* and 310*b* can be attached to respective posts 326*a* and 326*b* and posts 344*a* and 344*b* and rotationally connect rear body 302 and front body 304 to base 306.

When motor assembly 320 is energized impeller 308 rotates and induces air to enter the interior space of assembled rear and front bodies 302 and 304 through air passages 322. Air entering the interior space subsequently passes through impeller 308 and is expelled from the interior space as an exhaust air stream through air passages 342.

In some embodiments, the components, including the rear body 302, front body 304 and base 306, may be constructed of a polymer and may be injection molded. In some embodiments, the respective features of rear body 302, front body 304 and base 306 can be integrated and unitary with each respective component.

Figure 30A:
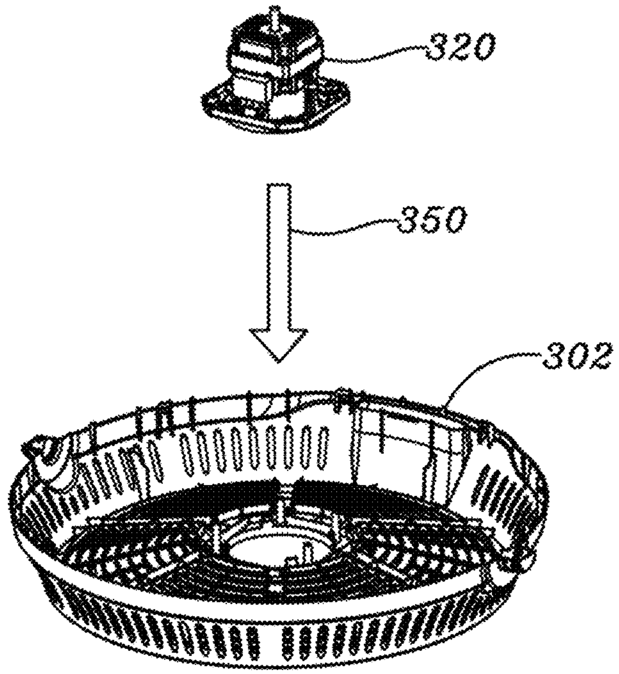
FIG. 30*a* through FIG. 34*b* show an assembly sequence for a fan utilizing the described structure, according to an embodiment of the present disclosure.
Figure 30B:
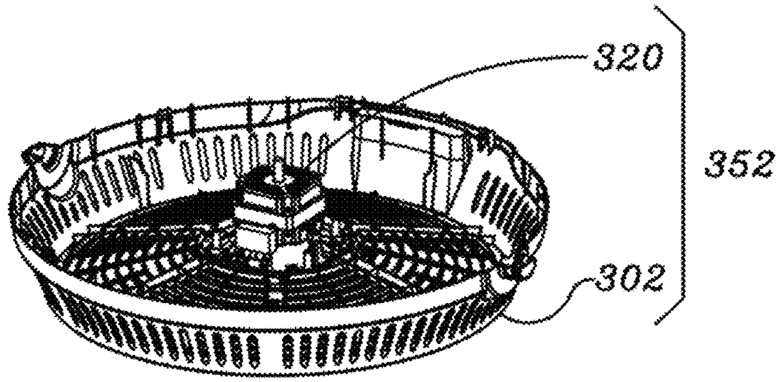

FIG. 30*a* through FIG. 34*b* show a tool-free assembly sequence for fan 300, according to an embodiment of the present disclosure. FIG. 30*a* shows assembly step one, according to an embodiment of the present disclosure. In some embodiments, at assembly step one, motor assembly 320 can be moved in the direction of arrow 350 to engage and connect rear body 302. FIG. 30*b* shows sub-assembly 352, according to an embodiment of the present disclosure. Sub-assembly 353 can include assembled motor 320 and rear body 302. Additional details regarding connection features between rear body 302 and motor assembly 320 are described below with respect to FIGS. 36-38.

Figure 31A:
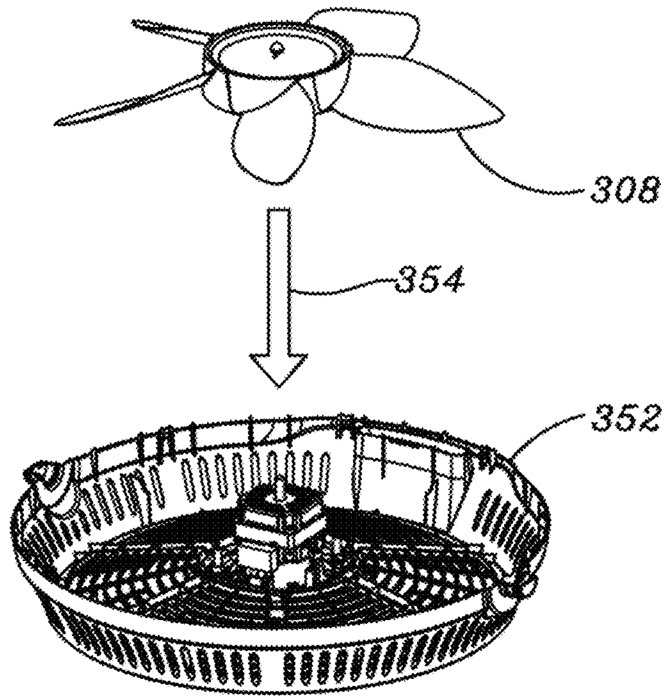
Figure 31B:
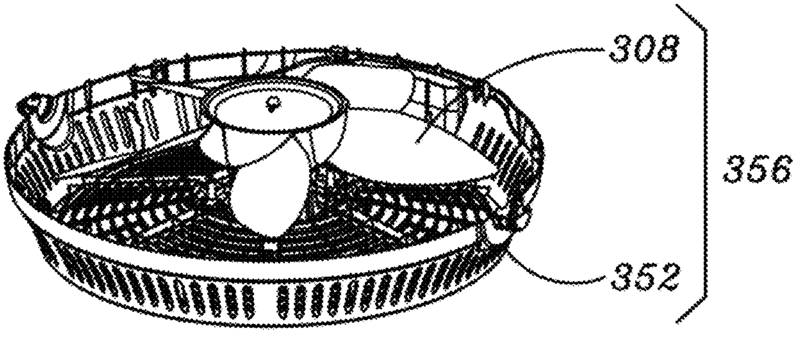

FIG. 31*a* shows assembly step two, according to an embodiment of the present disclosure. In some embodiments, at assembly step two, impeller 308 can be moved in the direction of arrow 354 to engage and connect to sub-assembly 352. FIG. 31*b* shows sub-assembly 356, according to an embodiment of the present disclosure. In some embodiments, sub-assembly 365 can include sub-assembled 352 and impeller 308.

Figure 32A:
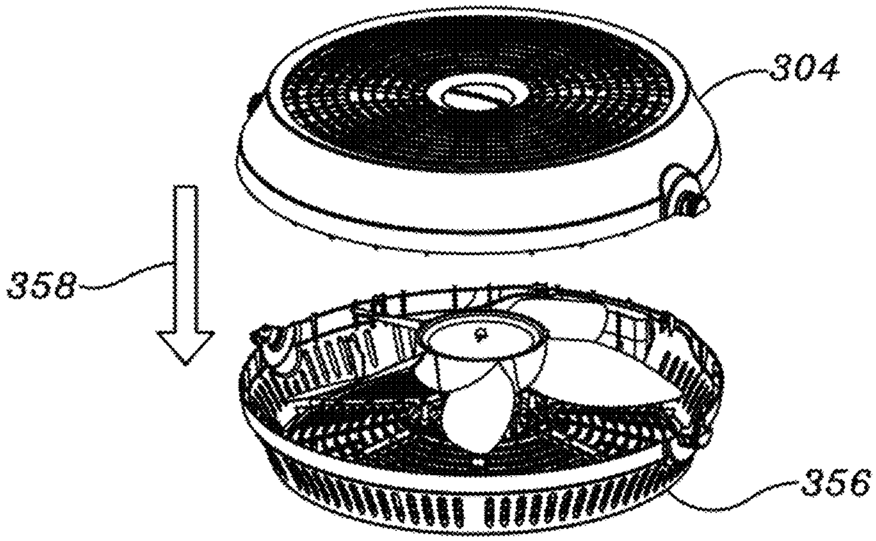
Figure 32B:
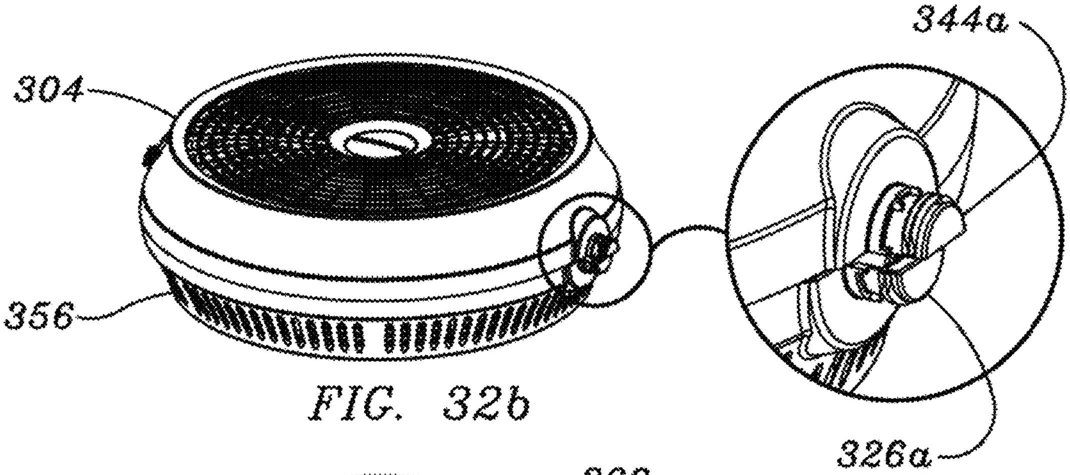
Figure 32C:
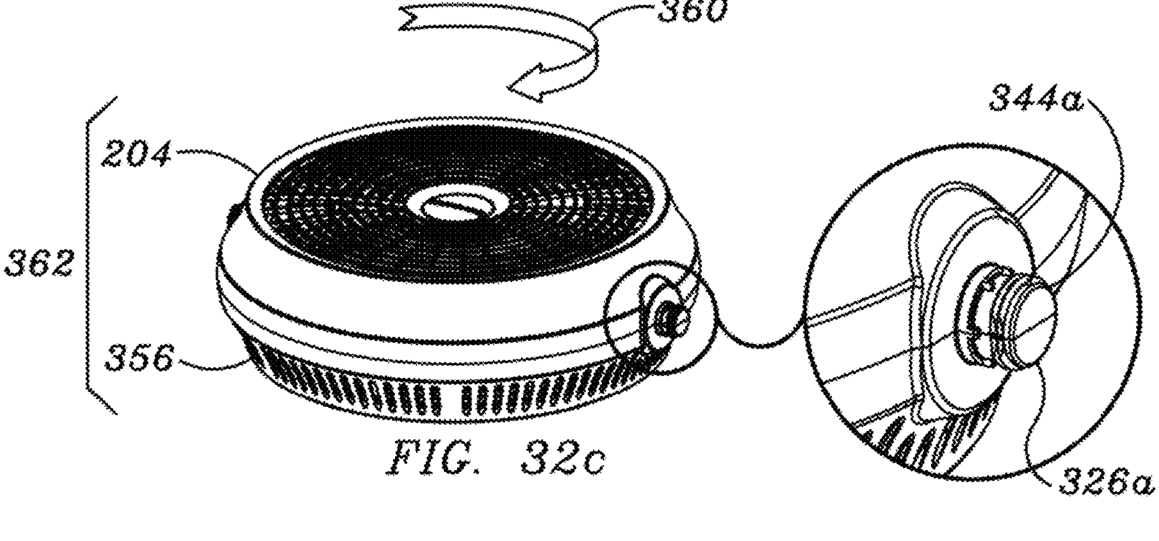
Figures 35A, 35B, 35C:
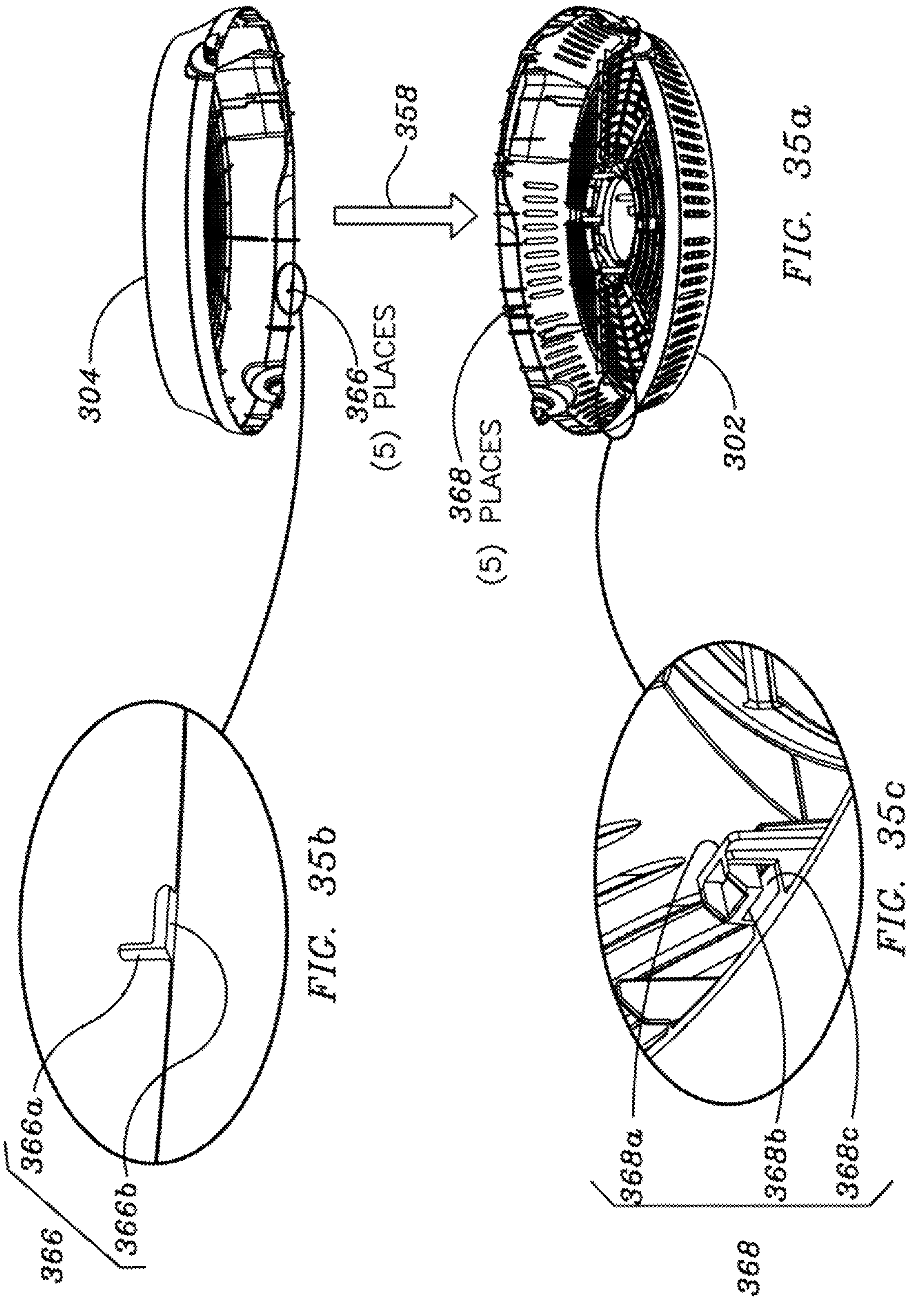
FIGS. 35*a*, 35*b*, and 35*c* illustrate an assembly interface between a front body and a rear body of a fan utilizing the described structure, according to an embodiment of the present disclosure.

FIG. 32*a* shows assembly step three, according to an embodiment of the present disclosure. In some embodiments, at assembly step three, front body 304 can be moved in the direction of arrow 358 to interface with sub-assembly 356. FIG. 32*b* shows that posts 326*a* and 344*a* are not aligned with respect to each other. FIG. 32*c* shows alignment of posts 326*a* and 344*a* via rotational movement 360 of front body 304 relative to sub-assembly 356. In some embodiments, rotational movement 360 connects front body 304 to sub-assembly 356 utilizing features as shown in FIGS. 35*a* through 35*c*. Sub-assembly 362 can include front body 304 and sub-assembly 356.

Figure 33A:
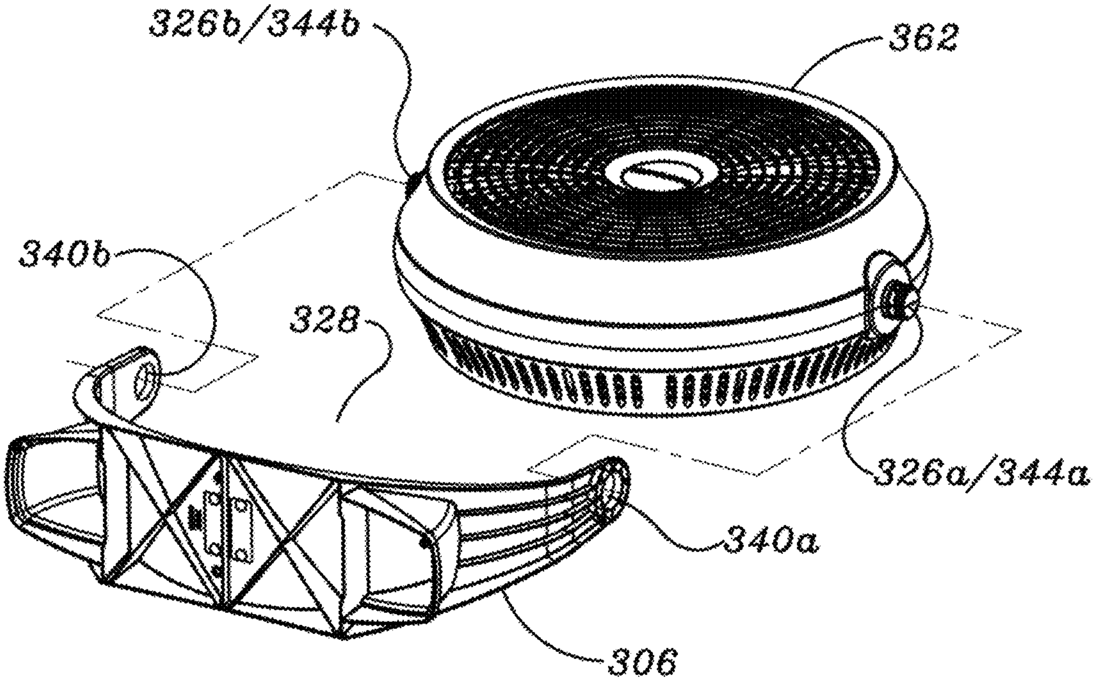
Figure 33B:
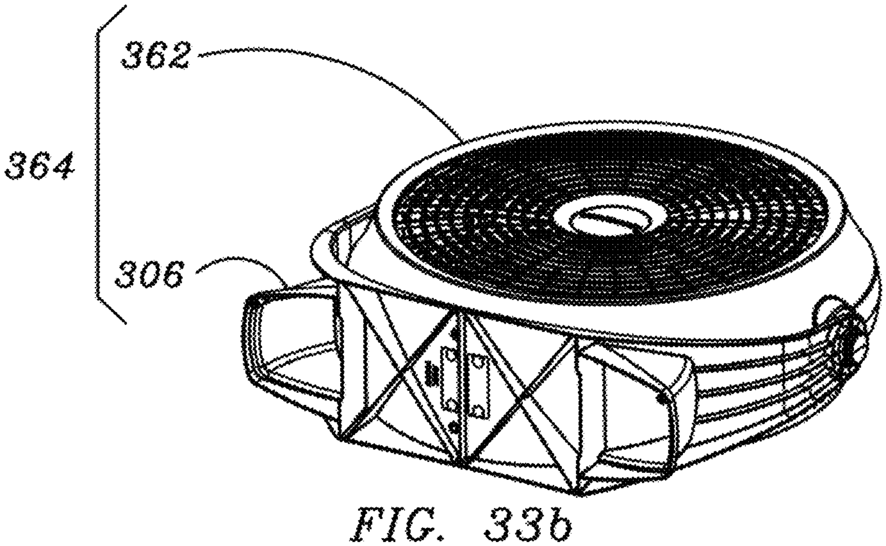

FIG. 33*a* shows assembly step four, according to an embodiment of the present disclosure. In some embodiments, at assembly step four, base 306 can be attached to sub-assembly 362. Posts 326*a*/344*a* and posts 326*b*/344*b* can pass through respective post holes 340*a* and 340*b*. The interface between sub-assembly 362 and base 306 can eliminate possible disassembly of front body 304 and sub-assembly 356 via a counter rotation of rotational movement 360. FIG. 33*b* shows sub-assembly 364, according to an embodiment of the present disclosure. In some embodiments, sub-assembly 364 can include sub-assembly 362 and base 306.

Figure 34A:
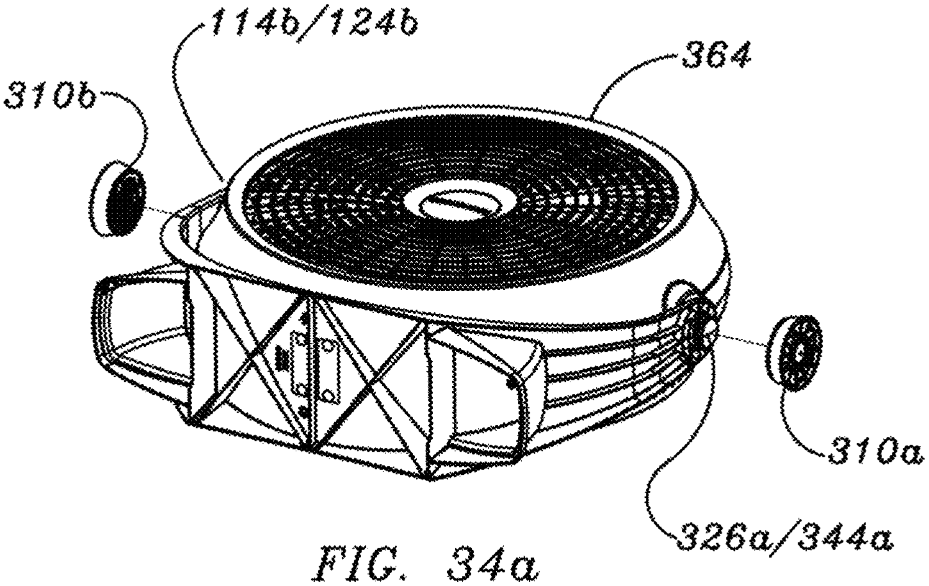
Figure 34B:
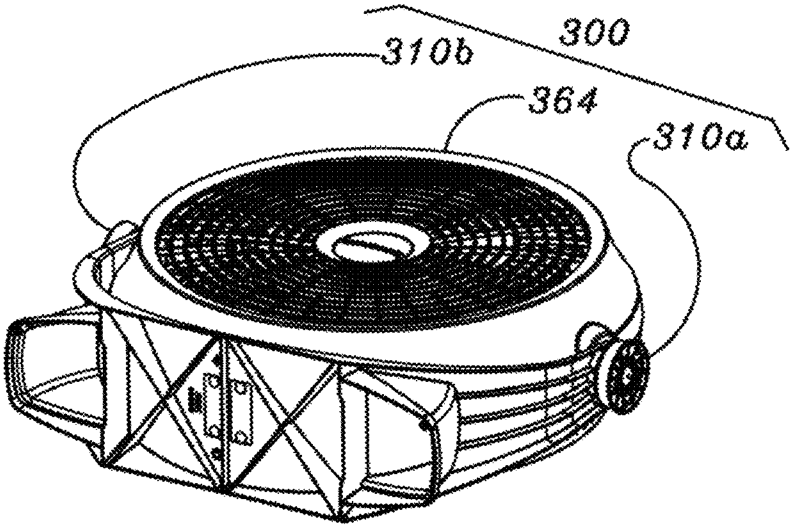

FIG. 34*a* shows assembly step five, according to an embodiment of the present disclosure. In some embodiments, at assembly step five, pivot knobs 310*a* and 310*b* can be attached to respective posts 326*a*/344*a* and posts 326*b*/344*b* of sub-assembly 364. Pivot knobs 310*a* and 310*b* and posts 326*a*/344*a* and posts 326*b*/344*b* can include an integrated thread system which allows pivot knobs 310*a* and 310*b* to be rotated onto respective and posts 326*a*/344*a* and posts 326*b*/344*b*. FIG. 34*b* shows fan 300 which includes sub-assembled 364 and pivot knobs 310*a* and 310*b*, according to an embodiment of the present disclosure.

FIG. 35*a* through 35*c* illustrates an assembly interface between rear body 302 and front body 304. Rear body 302 includes multiple attachment features 368 which correspond to multiple attachment features 366 on front body 304. Attachment features 368 include pillar 368*a* and upper plane 368*b* which define opening 368*c*. Attachment features 366 include catch 366*a* and horizontal plane 366*b*. As shown the respective attachment features 368 and 366 are integrated and unitary with the structure and material of respective rear body 302 and front body 304. Plane 366*b* enters opening 368*c* during assembly step three via rotational movement 360 (see FIGS. 32*a* through 32*c*) connecting rear body 302 to front body 304.

Figure 36:
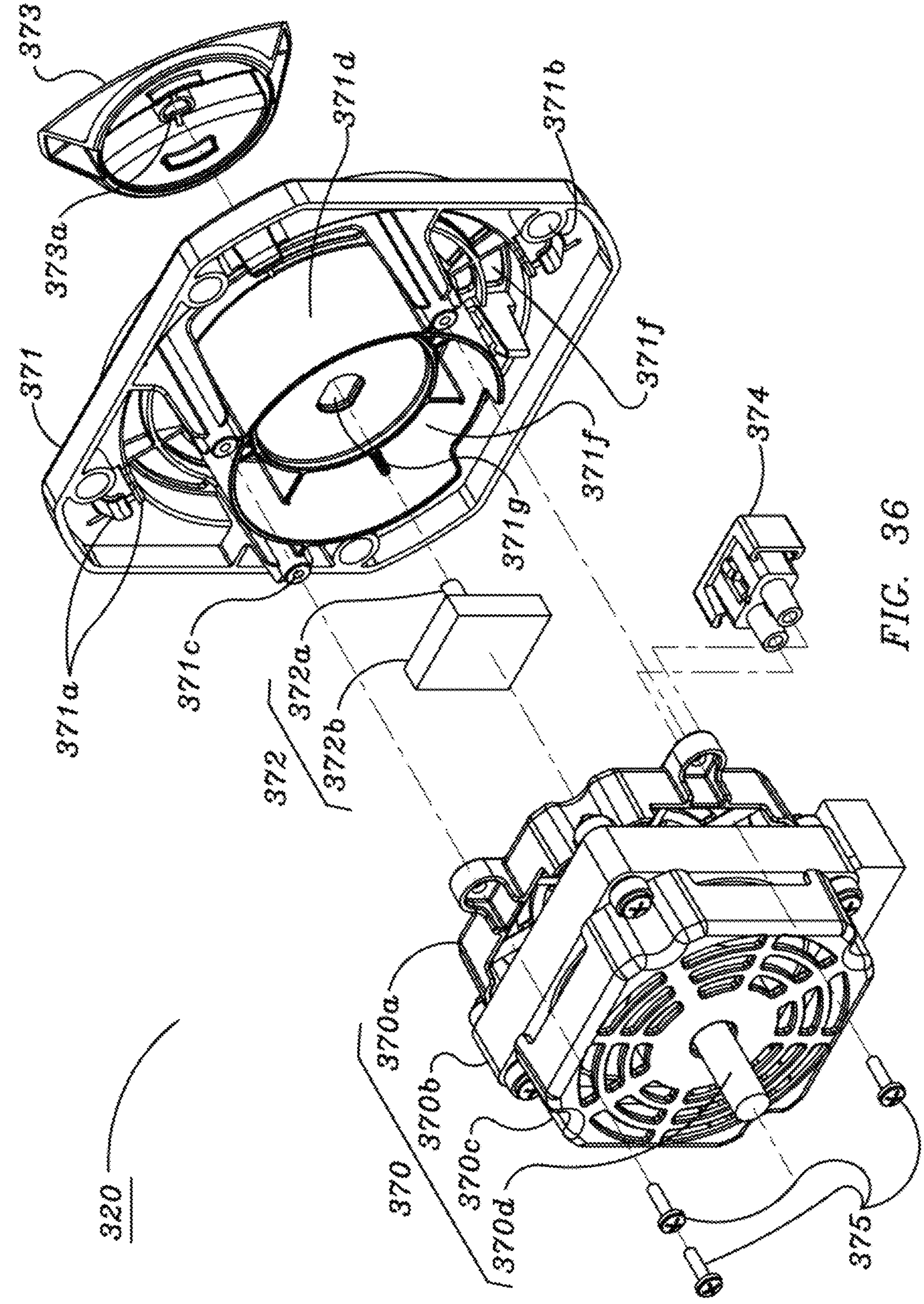
FIG. 36 is an exploded view of a motor assembly for a fan utilizing the described structure, according to an embodiment of the present disclosure.

FIG. 36 is an exploded view of motor assembly 320, according to an embodiment of the present disclosure. Motor 370 can include rear housing 370*a*, stator 370*b*, front housing 370*c* and rotor shaft 370*d*. Speed selection switch 372 can be connected to motor 370 and can include stem 372*a* and switch body 372*b*. Power cord port 374 can be connected to motor 370. Mounting plate 371 can be connected to motor 370 by multiple screws 375 and interface with multiple holes 371*c*. Mounting plate 371 can include multiple attachment features 371*a*, multiple pilot holes 371*b*, air channel wall 371*d*, air openings 371*e*, vents 371*f* and stem hole 371g. In some embodiments, stem 372*a* passes through stem hole 371*g* as motor 370 is attached to mounting plate 371. Speed selection knob 373 is connected to mounting plate 371 via stem 372*a* and socket 373*a*. Electrical connections between motor 370, power cord port 374 and switch 372 can be part of motor assembly 320.

Figure 37:
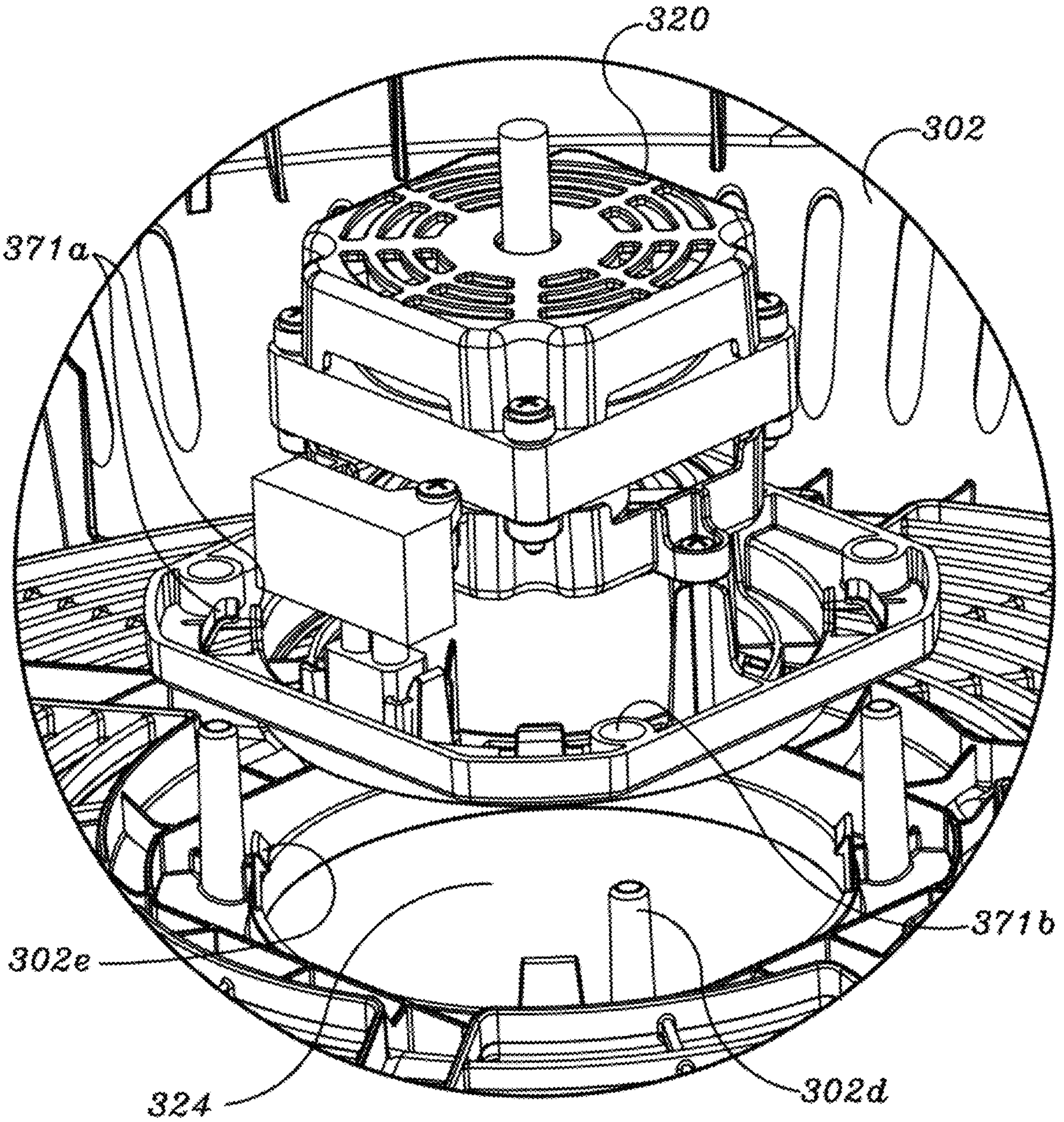
FIG. 37 and FIG. 38 illustrate an assembly interface between a motor assembly and a rear body for a fan utilizing the described structure, according to an embodiment of the present disclosure.
Figure 38:
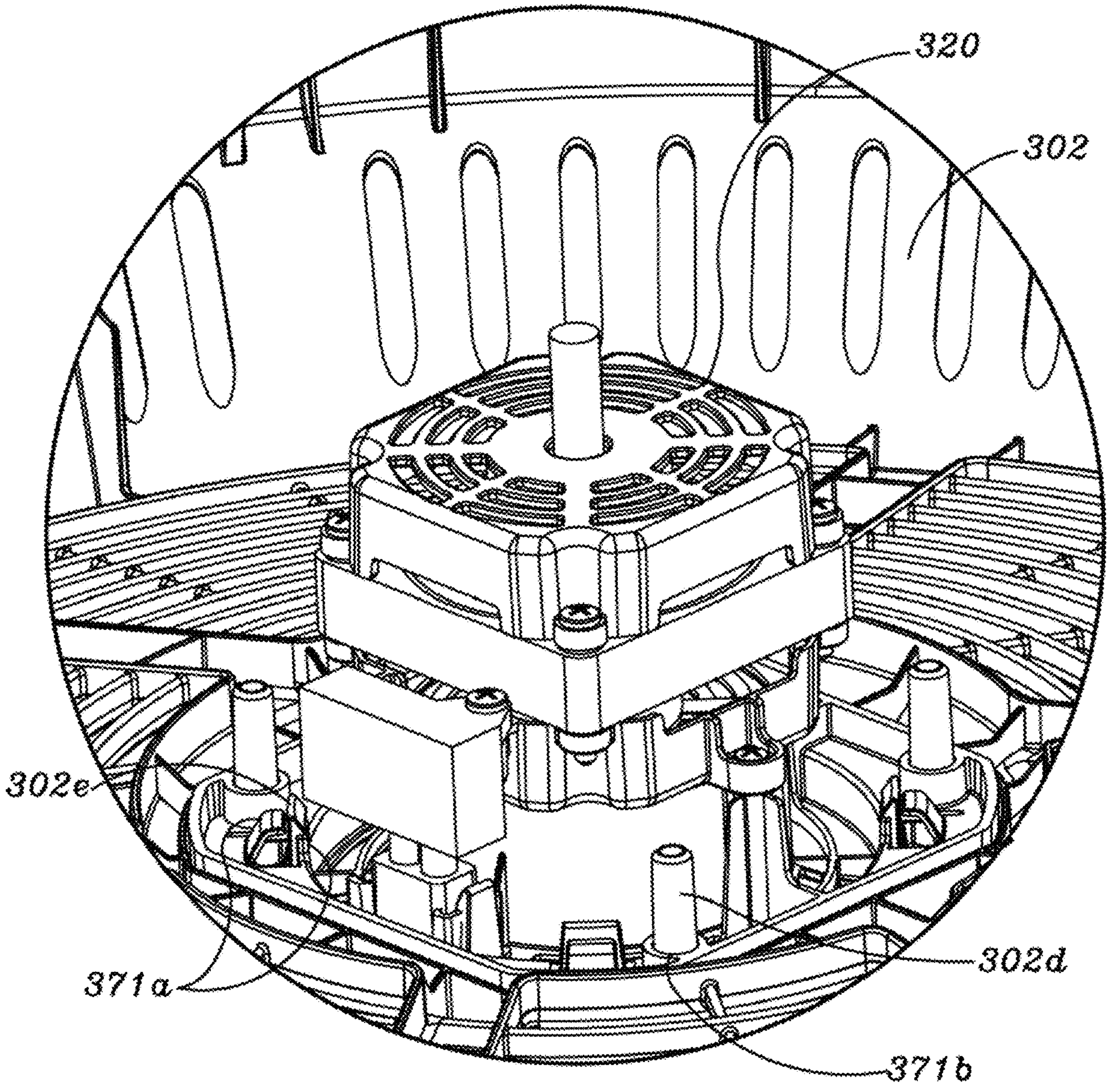

FIGS. 37 and 38 illustrate an assembly interface between motor assembly 320 and a rear body 302, according to an embodiment of the present disclosure. Rear body 302 can include multiple attachment features 302*e* and multiple assembly posts 302*d*. Multiple attachment features 302*e* can correspond to multiple attachment features 371*a* of motor assembly 320. Multiple assembly posts 302*d* can correspond to multiple pilot holes 371*b* of motor assembly 320. FIG. 38 shows assembly of rear body 302 to motor assembly 320, according to an embodiment of the present disclosure. Multiple assembly posts 302*d* and multiple pilot holes 371*b* can be used to facilitate alignment and position of multiple attachment features 302*e* to multiple attachment features 371*a* during assembly step one, as described with respect to FIGS. 30*a* and 30*b*.

Figure 39:
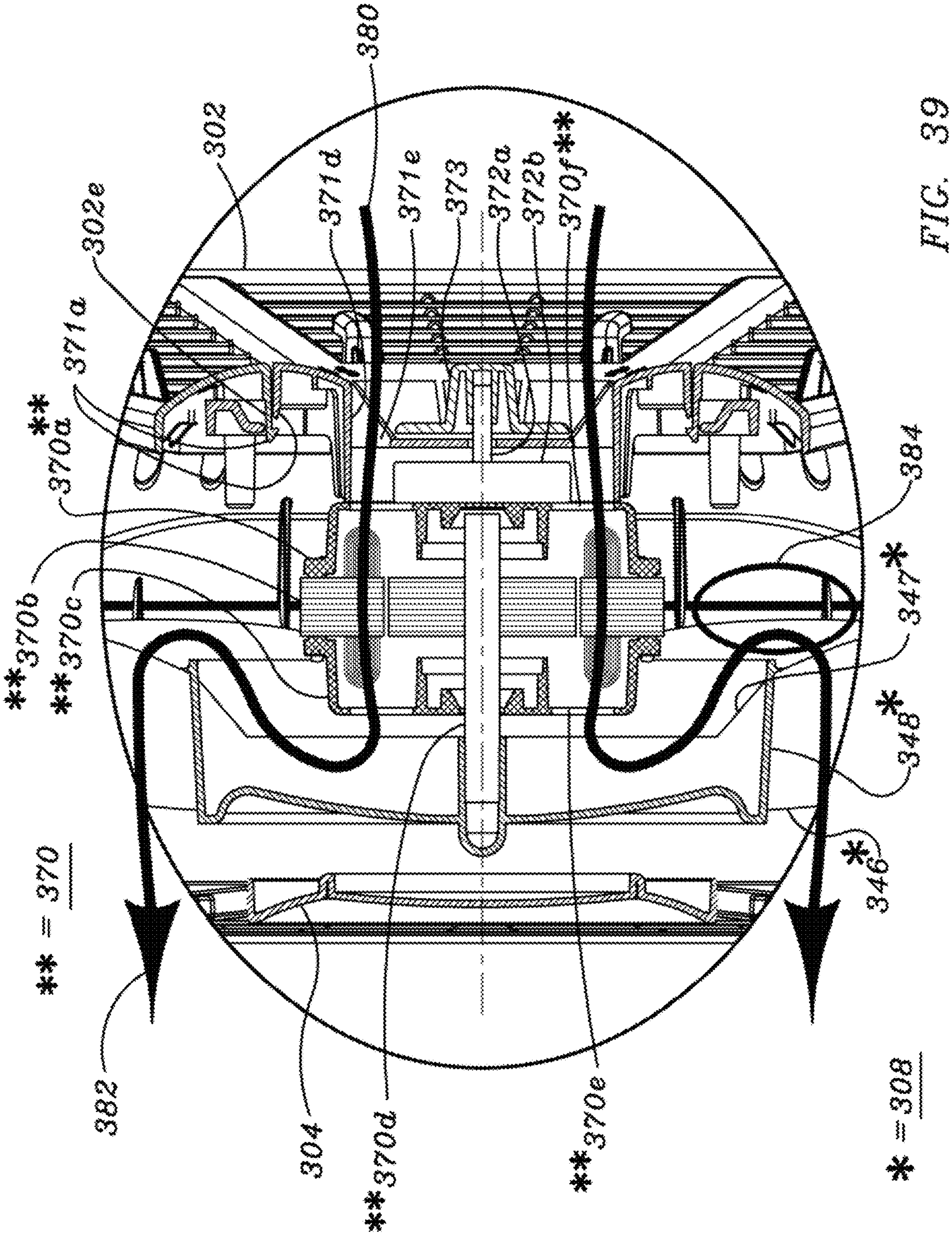
FIG. 39 illustrates an embodiment of electric motor cooling features incorporated in the structure.

FIG. 39 illustrates cooling features of motor 370, according to an embodiment of the present disclosure. Impeller 308 can rotate, creating low-pressure area 384 near multiple paddles 346. Hub 348 can include radial ribs 347 and is located adjacent to front housing 370*c*. Front housing 370*c* can include multiple vents 370*e* and rear housing 370*a* includes vents 370*f*. Air channel wall 371*d* can connect multiple vents 370*f* to multiple air openings 371*e*. Air flow 380 is induced to enter and pass through motor 370 through the connection between multiple air openings 371*e* and low-pressure area 384 via air channel wall 371*d* and hub 348. Air flow 380 can remove heat from motor 370 as it passes through motor 370 thereby mitigating heat build-up in motor 370. By removing heat from the motor 370 with air flow 380, the need to use additional materials such as steel and copper in motor 370 can be minimized or eliminated, which can be especially important in the construction of a fan or air circulator which is made of non-heat conductive materials such as polymer.

In some embodiments, as shown in FIG. 30*a* through FIG. 34*b*, the assembly of fan 300 can be unidirectional, and the assembly sequence may not require fan 300 to be inverted or repositioned during assembly. Static positioning during assembly permits additional automation possibilities and can simplify assembly further reducing the cost of fan 300.

In some embodiments, the rear bodies 202, 302 and front bodies 204, 304 can be made of molded polymer. The use of polymer has the advantage of isolating the electrical components (motor assemblies 218, 320) from the balance of fans 200 and 300 structures thereby increasing the safety for the end user when compared to conventional fans which made of metal.

In some embodiments, the assembly of fans 100, 200 and 300 do not require additional fastening methods such as screws, sonic welding, or adhesives. The integration of the assembly features supplements the opportunity to automate the assembly process and thereby can lower the manufacturing cost of fans 100, 200 and 300. Additionally, in some embodiments, motor assemblies 114, 218 and 320 may each be a sub-assembly which are fully wired and tested. In some embodiments, as shown fans 100, 200 and 300 do not require additional fasteners and therefore may not require additional functional and/or electrical testing after full assembly. This is an additional advantage reducing the final cost of fans 100, 200 and 300 to the manufacturer and to the end user.

In an embodiment, an assembly structure for a box fan is provided. The disclosed technology includes a unidirectional assembly sequence. The disclosed technology also includes: integrated features including snaps as integral parts of existing components. The integrated features provide an intuitive assembly/disassembly method absent the use of tools.

As described herein, an assembly and disassembly structure for a box fan which is designed to easily assemble. Conventional snap connections are commonly achieved using additional parts and components, further complicating assembly, and manufacturing. The assembly structure described herein utilizes snap features which are integrated into the primary structures i.e., no additional parts or components.

The assembly structure for a box fan here disclosed also allows for easy disassembly for cleaning. Also disclosed are rotatably articulated stabilization feet which has the further advantage of requiring minimal off-season storage space. Both features engender advantages for the end user when compared to conventional box fans.

In another embodiment, an air circulator with integrated assembly features in the disparate components reducing the number of fasteners, including a unidirectional assembly sequence which facilitates manufacturing. The air circulator can also be disassembled absent the use of tools simplifying the ability of the end user to maintain and clean the air circulator.

As described herein, is a structure for a fan or air circulator which requires minimal fasteners to manufacture. The assembly structure described herein utilizes features which are integrated into the structures of the components of the fan i.e., no additional parts or fasteners are required to achieve the assembly of and the interface between components.

The structure for the fan or air circulator disclosed includes features which dissipate the heat from an electric motor absent the addition of materials such as steel and copper to the motor structure while assuring that the performance is aligned with safety and industrial standards.

The assembly structure for the fan or air circulator disclosed also allows for easy disassembly for maintenance and cleaning. Also disclosed are features which aid the end user by more efficiently configuring the devise for off-season storage. These features create desirable advantages for the end user when compared to conventional fans and air circulators.

While various illustrative embodiments incorporating the principles of the present teachings have been disclosed, the present teachings are not limited to the disclosed embodiments. Instead, this application is intended to cover any variations, uses, or adaptations of the present teachings and use its general principles, and various of the above-disclosed and other features and functions, or alternatives thereof, may be combined into many other different systems or applications. Further, this application is intended to cover such departures from the present disclosure that are within known or customary practice in the art to which these teachings pertain and various presently unforeseen or unanticipated alternatives, modifications, variations or improvements therein may be subsequently made by those skilled in the art.

It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein are generally intended as "open" terms (for example, the term "including" should be interpreted as "including but not limited to," the term "having" should be interpreted as "having at least," the term "includes" should be interpreted as "includes but is not limited to," et cetera). While various compositions, methods, and devices are described in terms of "comprising" various components or steps (interpreted as meaning "including, but not limited to"), the compositions, methods, and devices can also "consist essentially of" or "consist of" the various components and steps, and such terminology should be interpreted as defining essentially closed-member groups.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention.

In addition, even if a specific number is explicitly recited, those skilled in the art will recognize that such recitation should be interpreted to mean at least the recited number (for example, the bare recitation of "two recitations," without other modifiers, means at least two recitations, or two or more recitations). Furthermore, in those instances where a convention analogous to "at least one of A, B, and C, et cetera" is used, in general such a construction is intended in the sense one having skill in the art would understand the convention (for example, "a system having at least one of A, B, and C" would include but not be limited to systems that have A alone, B alone, C alone, A and B together, A and C together, B and C together, and/or A, B, and C together, et cetera). In those instances where a convention analogous to "at least one of A, B, or C, et cetera" is used, in general such a construction is intended in the sense one having skill in the art would understand the convention (for example, "a system having at least one of A, B, or C" would include but not be limited to systems that have A alone, B alone, C alone, A and B together, A and C together, B and C together, and/or A, B, and C together, et cetera). It will be further understood by those within the art that virtually any disjunctive word and/or phrase presenting two or more alternative terms, whether in the description, sample embodiments, or drawings, should be understood to contemplate the possibilities of including one of the terms, either of the terms, or both terms. For example, the phrase "A or B" will be understood to include the possibilities of "A" or "B" or "A and B."

In addition, where features of the disclosure are described in terms of Markush groups, those skilled in the art will recognize that the disclosure is also thereby described in terms of any individual member or subgroup of members of the Markush group.

We claim:

1. A portable fan comprising:
a motor assembly comprising:
a housing,
a shaft extending from said housing comprising:
an axis of rotation of said shaft; and
a shaft connection feature extending perpendicular to said axis of rotation of said shaft,
an impeller of a unitary polymer construction comprising:
a hub comprising,
a central socket to interface with said shaft,
an impeller connection feature located proximate said central socket to interface with said shaft connection feature, and
multiple paddles extending radially outward from said hub,
wherein a connection of said impeller to said shaft of said motor assembly is achieved absent the use of additional fasteners and/or additional components.

2. The portable fan of claim 1 wherein said shaft connection feature comprises a round pin located through said shaft and protruding radially from opposite diametric sides of said shaft and said impeller connection feature comprises clearances on opposite sides of said central socket in said hub wherein said clearances correspond to said radial protrusions of said round pin.

3. The portable fan of claim 2 wherein said impeller connection feature further comprises retention fingers located proximate said clearances wherein said retention fingers impede a removal of said impeller from said shaft when said impeller is fully assembled on said shaft.

4. The portable fan of claim 1 wherein said motor assembly and said impeller are connected by a single movement parallel to said axis of rotation of said shaft.

5. A portable fan comprising:
an air generation assembly comprising:
a motor assembly,
a grill assembly defining an internal space, and
an impeller located substantially within said internal space;
a base for supporting said air generation assembly above a surface at a pre-determined elevation said base comprising:
a center socket, and
an outer extent defined by a maximum distance of said base as measured relative to said center socket;
an extension located between said base and said air generation assembly and connected to said base and said air generation assembly comprising:
a first portion comprising:
a first end including an adaptor capable of connecting to said air generation assembly; and
a second end, and
a second portion comprising:
a first end including an adaptor capable of connecting to said second end of said first portion and/or said air generation assembly, and
a second end;
wherein said second end of said first portion and/or said second end of said second portion can both interface and connect to said center socket of said base.

6. The portable fan of claim 5 wherein said pre-determined elevation comprises multiple elevations achieved by connecting said base to said air generation assembly by one or more of said portions of said extension.

7. The portable fan of claim 5 wherein connections of said portions of said extension to each other and/or to said base can be achieved absent the use of tools.

8. The portable fan of claim 5 wherein a length of said first portion is not the same as a length of said second portion of said extension.

9. The portable fan of claim 5 wherein said first and second portions are cylindrical in form and said first portion and said second portion include a hole passing radially through at least one wall of said cylindrical form near said second end of said respective first and second portions.

10. The portable fan of claim 9 wherein said center socket of said base includes a radially inwardly protruding feature which is capable of interfacing with said hole in said first or said second portions.

11. The portable fan of claim 9 wherein said first end of said first portion includes a radially protruding feature which is capable of interfacing with said hole in said second portion and said first end of said second portion includes a radially protruding feature which is capable of interfacing with said hole in said first portion.

12. The portable fan of claim 11 wherein said motor assembly further comprises a socket which includes at least one hole passing radially through at least one wall of said motor assembly socket wherein said radially protruding feature of said first end of said first or said second portions can interface and connect to said at least one hole of said motor assembly socket.

13. The portable fan of claim 11 wherein said radially protruding feature of said first end adaptor of said first or said second portions and said radially protruding feature of said center socket of said base can be displaced to allow for disassembly and/or height adjustment of said portable fan.

14. The portable fan of claim 5 wherein said interface between said first and second portions with each other and/or said air generator assembly and/or said base may include an indicator to indicate proper assembly and wherein said indicator is a sonic and/or tactile indictor detectable by an end user.

* * * * *